US007225182B2

(12) United States Patent
Paine et al.

(10) Patent No.: US 7,225,182 B2
(45) Date of Patent: May 29, 2007

(54) RECOMMENDING SEARCH TERMS USING COLLABORATIVE FILTERING AND WEB SPIDERING

(75) Inventors: Mark Paine, San Francisco, CA (US); Winton Davies, San Francisco, CA (US); Donald F. Geddis, Hillsborough, CA (US); Jon Dukes-Schlossberg, Palo Alto, CA (US); Darren J. Davis, Rowland Heights, CA (US)

(73) Assignee: Overture Services, Inc., Pasadena, CA (US)

( * ) Notice: Subject to any disclaimer, the term of this patent is extended or adjusted under 35 U.S.C. 154(b) by 233 days.

(21) Appl. No.: 10/020,712

(22) Filed: Dec. 11, 2001

(65) Prior Publication Data

US 2003/0055816 A1    Mar. 20, 2003

Related U.S. Application Data

(63) Continuation-in-part of application No. 09/911,674, filed on Jul. 24, 2001, which is a continuation of application No. 09/322,677, filed on May 28, 1999, now Pat. No. 6,269,361.

(51) Int. Cl.
G06F 17/30    (2006.01)
(52) U.S. Cl. ......................................................... 707/3
(58) Field of Classification Search .................... 707/1, 707/3, 4, 5, 7, 10, 104.1, 2; 345/854; 702/2; 705/51; 704/9; 709/226
See application file for complete search history.

(56) References Cited

U.S. PATENT DOCUMENTS 5,659,732 A    8/1997    Kirsch ........................ 395/605

5,717,923 A    2/1998    Dedrick ...................... 396/613
5,724,424 A    3/1998    Gifford ........................ 380/24

(Continued)

FOREIGN PATENT DOCUMENTS

JP    2000132559 A    5/2000

(Continued)

OTHER PUBLICATIONS

Database of Corporate ResourceNet, "New Service Puts An Auction Search Engine Under One Roof", Electronic Advertising & Marketplace Report, vol. 12, Issue 8, Apr. 1998, page 6.

(Continued)

*Primary Examiner*—Etienne P LeRoux
(74) *Attorney, Agent, or Firm*—Brinks Hofer Gilson & Lione

(57) ABSTRACT

In a pay-for-placement search system, the system makes search term recommendations to advertisers managing their accounts in one or more of two ways. A first technique involves looking for good search terms directly on an advertiser's web site. A second technique involves comparing an advertiser to other, similar advertisers and recommending the search terms the other advertisers have chosen. The first technique is called spidering and the second technique is called collaborative filtering. In the preferred embodiment, the output of the spidering step is used as input to the collaborative filtering step. The final output of search terms from both steps is then interleaved in a natural way.

19 Claims, 20 Drawing Sheets

U.S. PATENT DOCUMENTS

| | | | |
|---|---|---|---|
| 5,724,521 A | 3/1998 | Dedrick | 395/226 |
| 5,724,524 A | 3/1998 | Hunt et al. | 395/237 |
| 5,748,954 A | 5/1998 | Maudlin | 395/610 |
| 5,752,238 A | 5/1998 | Dedrick | 705/14 |
| 5,768,521 A | 6/1998 | Dedrick | 395/226 |
| 5,778,367 A | 7/1998 | Wesinger, Jr. et al. | |
| 5,794,210 A | 8/1998 | Goldhaber et al. | 705/14 |
| 5,799,268 A * | 8/1998 | Boguraev | 704/9 |
| 5,826,241 A | 10/1998 | Stein et al. | 705/26 |
| 5,848,397 A | 12/1998 | Marsh et al. | 705/14 |
| 5,848,407 A | 12/1998 | Ishikawa et al. | 707/2 |
| 5,852,820 A | 12/1998 | Burrows | 707/2 |
| 5,855,008 A | 12/1998 | Goldhaber et al. | 705/14 |
| 5,862,223 A | 1/1999 | Walker et al. | |
| 5,864,845 A | 1/1999 | Voorhees et al. | 707/5 |
| 5,864,846 A | 1/1999 | Voorhees et al. | 707/5 |
| 5,867,799 A * | 2/1999 | Lang et al. | 707/1 |
| 5,872,850 A * | 2/1999 | Klein et al. | 705/51 |
| 5,903,882 A | 5/1999 | Asay et al. | 705/44 |
| 5,918,014 A | 6/1999 | Robinson | 395/200.49 |
| 5,920,854 A | 7/1999 | Kirsch et al. | 707/3 |
| 5,920,859 A | 7/1999 | Li | 707/5 |
| 5,931,907 A | 8/1999 | Davies et al. | |
| 6,078,866 A * | 6/2000 | Buck et al. | 702/2 |
| 6,078,916 A * | 6/2000 | Culliss | 707/5 |
| 6,085,186 A | 7/2000 | Christianson et al. | |
| 6,141,010 A * | 10/2000 | Hoyle | 345/854 |
| 6,269,361 B1 | 7/2001 | Davis et al. | 707/3 |
| 6,285,987 B1 | 9/2001 | Roth et al. | |
| 6,289,341 B1* | 9/2001 | Barney | 707/6 |
| 6,314,420 B1* | 11/2001 | Lang et al. | 707/3 |
| 6,421,675 B1* | 7/2002 | Ryan et al. | 707/3 |
| 2001/0047354 A1 | 11/2001 | Davis et al. | |
| 2002/0004735 A1 | 1/2002 | Gross | 705/10 |
| 2002/0169875 A1 | 11/2002 | Furui et al. | 709/225 |
| 2003/0088554 A1* | 5/2003 | Ryan et al. | 707/3 |

FOREIGN PATENT DOCUMENTS

| | | |
|---|---|---|
| JP | 2001014349 A | 1/2001 |
| WO | WO 97/22066 A | 6/1997 |
| WO | WO 99/20486 | 9/1999 |
| WO | WO 99/48028 | 9/1999 |
| WO | WO 00/16218 A | 3/2000 |
| WO | WO 2000/16218 | 3/2000 |
| WO | WO 2000/41090 | 7/2000 |
| WO | WO 01/46856 A1 | 6/2001 |
| WO | WO 02/03303 A1 | 1/2002 |

OTHER PUBLICATIONS

Espe, "Online Search Engines Start To Charge For Listings", Washington Business Journal, vol. 18, Issue 1, May 1999, p. 31.
Dawson et al., "2 Search Sites Narrow Their Parameters", Adweek-Western Edition, vol. 48, Issue 42, Oct. 1998, p. 1.
Database of Corporate ResourceNet, "Bits", from Adweek-Eastern Edition, vol. 40, Issue 14, Apr. 1999, p. 46.
Komando, "Searching For Search Engines—from Dogpile to Deja News", Business First-Colombus, vol. 14, Issue 43, Jun. 1998, p. 46.
Database of Corporate ResourceNet, New services Aim to Boost Efficiency of Search Engines, Electronic Advertising & Marketplace Report, vol. 12, Issue 13, Jun. 1998, p. 6.
Database of Corporate ResourceNet, "Goto.com Chooses Quest's SharePlex(R) for Oracle Software to Ensure Uptime for Business-Critical Web Site", PR Newswire, Jun. 2000.
Database of Corporate ResourceNet, "Capitalist Tool", Time Canada, vol. 151, Issue 8. Mar. 1998, p. 41.
Database of DialogClassic(m), :Homestead Technologies' Continued Success Draws $17.50 Million In second Round of Venture Funding, PR Newswire, Apr. 1999.
"APS Search Tools—Patent Search Client Strategy", by US Patent & Trademark Office, Sep. 1997.
"Frequently Asked Questions NT Image Search & Retrieval (IS &R)", by US Patent & Trademark Office, Dec. 1997.
"Chapter 1-Introduction to Dialog", by Dialog Information Service, Inc. pp. 1-1 to 1-14.
"Automated Patent System (APS) Workstation Reference Manual", by US Patent & Trademark Office, Jul. 1996.
Frentzen, Jeff, "Help for Getting the Word Out About Web Sites", PC Week, v14, n46, p. 27(1), Nov. 3, 1997.
Miller, Karen L., "Improve Your Ranking (Building Web Sites to Attract Web Searches)", Home Office Computer, v16, n1, p. 51(2) Jan. 1998.
Wingfiled, "Another Engine Takes Ads By The Click", from http://www.news.com?news/Item/0.4.1387,00/html, May 1996.
Pelline, "New Search Engine Goes Commercial", by CNET News.com, Feb. 1998.
Wang, "Engines Battle Irrelevance of Results-New Search Service Hope To Fill The Void", by Internet World, Feb. 1998.
Vondr Haar, "Searching For The Highest Bidder", from *Inter@active* week.
Riedman, "Search Engine Startup To Auction Listings", from Inter-active-Advertising, Feb. 1998.
Rich, "New Search Engine Allows Sites To Pay Their Way to Top", from http://www.adweek.com/iq/iqnews02.asp.
Mardesich, "Web Site Operators Pay for Top Billing-Search Engine Allows Site Sponsors to Buy Place On Special List", from Knight Ridder Newspapers, Mar. 1998.
Hilty, "GoTo.Hell-What Happens When On Line Search Engine Accepts Cash From Web Sites?" from http://www.ocweekly.com/link/archives/97/27/byte-3.11.98-1.html, Mar. 1998.
Flynn, "With GoTo.com's Search Engine, the Highest Bidder Shall Be Ranked First", by the New York Times, Mar. 1998.
Clark, "Start-Up Plans Internet Search Service Tying Results To Advertising Spending", from the Wall Street Journal, Feb. 1998.
"Going, Going . . . ", from A Closer Look of the Wall Street Journal-Marketplace, Apr. 1998.
"Coursey.com", David Coursey's Insider report on Personal Computing, the Internet and Communications, Mar. 1998.
Glaser, "Who Will GoTo.com", from OnlinePress.com, Feb. 1998.
Mardesic, "Search Engine Charges Hit Sites", from http://www.sjmercury.com/business/center/goti022198.html, Feb. 1998.
"News Watch About Search Engines", from http://searchenginewatch.com/ness.html, Feb. 1998.
Wang, "Engines Battle Irrelevance of Results", from Internet World.
Swartz, "Browser Only Lists Paying Web Sites Critics Fear Approach Will Squeeze Out Most Small Internet Players", from http://www.sfgate.com/cgi-bin/ publish on San Francisco Chronicle, Feb. 1998.
McWilliams, PC World Online, Feb. 23, 1998, "Search Engine To Sell Top Positions On Results Lists", from http://www.pcworld.com/news/daily/data/ 0298/ . . . html.
"Search Engine Start Up To Auction Listings", from http://www.adage.com/interactive/daily/index/html, Feb. 1998.
Alyson, "Searching The Search Engines", from Bacon's, May 1998.
Pelline, "Pay-for-placement gets another shot", from http://www.newscom.?news/item/0,4,19307,00.html, Sep. 1997.
IBM Technical Disclosure Bulletin, "Organizing A Ranked List of Search Matches", Nov. 1994.
Jeffrey Brewer, ClickZ Today, Aug. 18, 1998, "Pay-For-Performance: Creating More And Better Value", obtained at the internet address http://www.clickz.com, Aug. 18, 1998.
Jesse Berst, ZDNet, Aug. 17, 1998, "Search Sites' Shocking Secret", obtained at the internet address http://www.zdnet.com/anchordesk/story/story_2432.html, Aug. 17, 1998.
Sara Fisher, "Budding Internet Firm Finds Niche in Satisfaction", L.A. Business Journal, Aug. 10, 1998.
"Disclosure Rules", The Industry Standard—The Newsmagazine of the Internet Economy, Aug. 10, 1998.
G. David Doran, "Pay to Play", Entrepreneur, Jul. 1998, p. 18.
Advertising Age-Interactive Daily Homepage; obtained at the internet address http://www.adage.com/interactive/daily/index.html, Jun. 8, 1998.

Kim Komando, "With About 320 Million Sites, Search Engines Offer Some Help", copyright 1998, Los Angeles Times Syndication.

Margot Williams, "How To Ease Your Online Searches", Lansing State Journal, Jun. 1, 1998.

"GoTo.com Gets Venture Funding", Internet World Magazine, Jun. 1, 1998.

Sasha Alyson, "Searching The Search Engines", Front Page, May 8, 1998.

Advertising Age-Interactive Daily Homepage, Feb. 23, 1998, "Search Engine Startup To Auction Listings", obtained at the internet address http://www.adage.com/interactive/mdaily/index.html.

Brian McWilliams, PC World Online, Feb. 23, 1998, "Search Engine To Sell Top Positions On Results Lists", obtained at the internet address http://www.pcworld.com/news/daily/data/0298/9880223173204.html.

Jon Swartz, San Francisco Chronicle, Feb. 23, 1998, "Browser Only Lists Paying Web Sites Critics Fear Approach Will Squeeze Out Most Small Internet Players", obtained at the internet address http://www.sfgate.com/cgi-bin/arti...le/archive/1998/02/21/BU102470.DTL.

Nelson Wang, "Engines Battle Irrelevance of Results", from http://www.internetworld,com/print/current/news/19980223-battle.html, Feb. 1998.

Search Engine Watch, Feb. 21, 1998, "GoTo Sells Positions", obtained at the internet address http://www.searchenginewatch.com/news.html, Feb. 23, 1998.

Jodi Mardesich, "Search Engine Charges Hit Sites", from http://wwww.sjmercury.com/businrss/center/goto022198.html, Feb. 1998.

Ken Glaser, Who Will GoTo.com?, OnlinePress.com, Feb. 1998.

Jeff Pelline, "New Search Engine Goes Commercial", from http://www.news.com/News/Item/ 0,4,19281,00.html, Feb. 20, 1998.

"Going, Going . . . ", The Wall Street Journal, Apr. 1998. p. B1.

David Coursey, "Coursey.com", Mar. 1998.

Don Clark, "Start-Up Plans Internet Search Service Tying Results To Advertising Spending", The Wall Street Journal, Feb. 20, 1998.

Laurie J. Flynn, "With GoTo.com's Search Engine, The Highest Bidder Shall Be Ranked First", The New York Times, Mar. 1998, p. C1.

Wyn Hilty, OCWeekly byte marks, "GoTo.Hell", from http://www.ocweekly.com/ink/archives/97/27byte-3.11.98-1.shtml, Mar. 13, 1998.

Jodi Mardesich, "Web Site Operators Pay For Top Billing", The News—Herald (Willoughby, OH), Mar. 2, 1998.

Laura Rich, Adweek Online IQ News Online, Feb. 23, 1998, "New Search Engine Allows Sites to Pay Their Way to Top", from http://www.adweek.com/iq/ iqnews02.asp, Feb. 1998.

Patricia Riedman, "Search Engine Startup To Auction Listings", Advertising Age Magazine, Feb. 23, 1998, p. 34.

Steven Vonder Haar, ZDNet,com, Feb. 19, 1998, "Searching For The Highest Bidder", obtained at the internet address http://www.zdnet.com/intweek/daily/980219i.html, Feb. 23, 1998.

Nelson Wang, "Engines Battle Irrelevance of Results", Internet World, Feb. 10, 1998, p. 1.

Interactive Week Magazine, Garden City, N. Y. May 25, 1998.

Jeff Pelline, "New Search Engine Goes Commercial", CNET News.com, from http://www.news.com/News/Item/0,4,19281,00.html, Feb. 20, 1998.

Nick Wingfield, Staff Writer, CNET News.com, Jun. 21, 1996, "Engine Sells Results, Draws Fire", obtained at the internet address http://www.news.com/News/Item/Textonly/0,25,1635,00.html, Jul. 29, 1999.

Nick Wingfield, Staff Writer, CNET News.com, May 22, 1996, "Another Engine Takes Ads By The Click", obtained at the internet address http://www.news.com/News/Item/0,4,1387,00.html, Jul. 29, 1999.

Rose Aguilar, Staff Writer, CNET News.com, Apr. 29, 1996, "New Ad Model Charges By The Click", obtained at the internet address http://www.news.com/News/Item/0,4,1199,00.html, Jul. 29, 1999.

Alex Lash, Staff Writer, CNET News.com, Dec. 11, 1996, "Open Text Updates Tools", obtained at the internet address http://www.news.com/News/Item/0,4,6118,00.html, Jul. 29, 1999.

"About SearchUP, Inc.", Jul. 15, 1999, obtained at the internet address http://searchup.com/about.cfm.

"Testimonials"., Jul. 15, 1999, obtained at the internet address http://www.searchup.com/testimonials.cfm.

"Benefits", Jul. 15, 1999, obtained at the internet address http://www.searchup.com/benefits.cfm.

"Information", Jul. 15, 1999, obtained at the internet address http://www.searchup.com/information.cfm.

"Tips & Tricks", Jul. 15, 1999, obtained at the internet address http://www.searchup.com/tipsandtricks.cfm.

Correspondence from Bryan Buck, President of SearchUp.com, Jul. 7, 1999.

Saul Hansell "Alta Vista Invites Advertisers to Pay for Top Ranking", The New York Times, Apr. 15, 1999, p. C2.

Galore—Super Search Engine, May 21, 1999, obtained at the internet address http://www.galore.com/1/mainframe.shtml.

hitsgalore.com Search Engine, May 21, 1999, obtained at the internet address http://www.hitsgalore.com.

I Seek It "The Next Generation Search Engine", May 21, 1999, obtained at the internet address http://www.iseekit.com.

Correspondence from Emilia F. Cannella to Robert Brahms, CEO of BeFirst Internet Coporation regarding findwhat.com, Jul. 20, 1999.

Correspondence from Emilia F. Cannella to Michael Melcher, MC Services regarding SearchUP.com, Jul. 1, 1999.

Correspondence from Emilia F. Cannella to Robert G. Schuler, Esq., Kegler, Brown, Hill & Ritter regarding iseekit.com, Jul. 1, 1999.

Correspondence from Emilia F. Cannella to Andrew Conru, Vote Publishing regarding galore.com, Jun. 30, 1999.

SearchUP.com—Internet Directory, Automated Bid Placement System, obtained at the internet address http://www.searchup.com/search.cfm, Aug. 25, 1999.

SearchUP: URL Position Manager, obtained at the internet address https://www.securearea.net/searchup/login.cfm, Aug. 25, 1999.

SearchUP: URL Position Manager, obtained at the internet address https://www.securearea.net/searchup/newaccount.cfm, Aug. 25, 1999.

SearchUP: URL Position Manager, obtained at the internet address https://www.securearea.net/getaccount/login.cfm, Aug. 25, 1999.

Correspondence from Emilia F. Cannella to Mr. D. Reed, Reports Galore, regarding hitsgalore.com, Jun. 30, 1999.

Miller, Karen L., "Improve Your Ranking", Home Office Computer, vol. 16, No. 1, Jan. 1998, p. 51(2).

Jeff Fretzen, "Help For Getting The Word Out About Web Sites", PC Week, Vo. 14, No. 46, Nov. 3, 1997, p. 27(1).

Article from the Search Engine Report, "GoTo To Sell Positions", Mar. 3, 1998, http://www.searchenginewatch.com/sereport/9803-to-to-html.

Article from CNET News, "Engine Sells Results, Draws Fire", Jun. 21, 1996, http://www.nees.com/News?Item/0,4,1635,00.html.

Press release on Lightweight Directory Access protocol (LDAP), Netscape Comm. Corp. Mountain View, CA., Apr. 1996.

ClickMail Central directory, circa Apr. 1996.

GoTo.com, circa 1998, at www.goto.com.

Northern Light, circa 1997-98, at sirocco.northernlight.com.

Smith, Laura B., article "Going . . . Gone", PC Week, vol. 13, No. 34, Aug. 26, 1996, p. E1 (2), http://www.dialog-classic.com/DialogClassic/dialog.

* Cliff Kurtzman, "Another Internet Advertising List", Internet Advertising Digest #006, dated Jun. 19, 1996, from http://www.o-a.com/archive/1996/june.0021.html, printed Sep. 28, 2001, 5 pages.

* Press Release article titled "GoTo.com Announces First round of Financing, Totaling More Than $6 Million, Led by Draper, Fisher Jurvetson", *Business Wire*, dated May 19, 1998, printed from the Internet at <http://www.dialogclassic.com/main.vingw> on Nov. 9, 2000, 2 pages.

News of The Week articles, *Telephony*, May 1, 1995, pp. 8 and 10.

Nuts 'N Bolts articles, *Target Marketing*, Oct. 1997, 1 page.

DoubleClick TestIt!, obtained at the internet address: http://web.archive.org/web/19980205034316/www.doubleclick.com/nf/adinfo/testiset.htm, dated Oct. 16, 2002, 4 pages.

DoubleClick Frequently Asked Questions, obtained at the internet address: http://web.archive.org/web/19980205033925/www.doubleclick.com/nf/adinfo/facts.htm, dated Oct. 16, 2002, 5 pages.

"New Service Puts Ad Auction, Search Engine Under One Roof", article from Electronic Advertising & Marketplace Report, *Simba Information, Inc.* Apr. 28, 1998, 2 pages.

Google Search, communication from Jeffrey Brewer at Jeffrey@goto.com, titled "Need reverse stemming software", dated May 27, 1998, obtained at the internet address: http://groups.google.com/groups?selm=356CEE4A8DE882A8%40goto.com, on Dec. 19, 2002, 1 page.

Ketchpel, Steven P. et al. "U-PAI: A Universal Payment Application Interface", conference material article from the Second USENIX Workshop on Electronic Commerce Proceedings, Oakland, California, Nov. 18-21, 1996, 17 pages.

Schwartz, Randal L., "Click-Through Tracking in Perl", *Web Techniques*, dated May 1998, located at the internet address: www.webtechniques.com, 3 pages.

Van Roeden, Adriaan, "Your Own Search Engine With SWISH, A Custom Search Facility For Your Web Site", *Web Techniques*, dated Nov. 1996, located at the internet address: www.webtechniques.com, pp. 63-66 pages.

Full Catalog—Categories Menu, Sun Microsystems Sun Solutions Catalog, obtained at the internet address: http://web.archive.org/web/19981205110211/solutions.sun.com/catalogs/all/index.htm, printed on Dec. 19, 2002, 2 pages.

Help on Making Queries—Search by Company or Product, obtained at the internet address: http://web.archive.org/web/19981203050002/solutions.sun.com/search-help.htm, printed on Dec. 19, 2002, 4 pages.

Online Updating, Sun Microsystems Sun Solutions Catalog obtained at the internet address: http://web.archive.org/web/19990220190636/solutions.sun.com/editmodule/help.html, printed on Dec. 19, 2002, 2 pages.

European Patent Office Search Report for corresponding application No. EP 0 25 8082.3, dated Apr. 6, 2004, 3 pages.

Preliminary Search Report for corresponding application No. FR 0215627, dated Mar. 31, 2004, 2 pages.

Cho, Junghoo et al., "Efficient crawling through URL ordering", *Computer Networks and ISDN Systems*, 1998, pp. 161-172.

Cohen, William W. et al., "Web-collaborating filtering: recommending music by crawling the Web", *Computer Networks 33*, 2000, pp. 685-698.

Supplementary Search Report for corresponding European Patent Application No. EP 00 936393, dated Feb. 20, 2004, 3 pages.

Brin, Sergey et al., "The Anatomy of a Large Scale Hypertextual Web Search Engine", *Computer Networks and ISDN Systems*, North Holland Publishing, Amsterdam, NL, dated Apr. 14, 1998, pp. 1-20.

Doran, David, "Search Engines . . . Their popularity, their secrets, their flaws", *Entrepreneur*, Jul. 1998, p. 18.

Glaser, Ken, "Who Will GoTo.com?", *OnlinePress.com*, dated Feb. 20, 1998, 2 pages.

Kramer, Ralf et al., "Thesaurus federations: loosely integrated thesauri for document retrieval in networks based on Internet technologies", *Int. J. Digit Libr*, 1997, pp. 122-131.

Sullivan, Danny, "GoTo Sells Positions", *The Search Engine Report*, dated Mar. 3, 1998, 4 pages.

"GoTo.com Announces First Round of Financing, Totaling More Than $6 Million, Led by Draper Fisher Jurvetson", *Business Wire*, dated May 19, 1998, printed from Dialog Gale Group New products, 2 pages.

"New Service Puts Ad Auction, Search Engine Under One Roof", *Electronic Advertising & Marketplace Report*, dated Apr. 28, 1998, vol. 12, Issue 8, 2 pages.

McCallum, A.; Nigam, K.; Rennie, J.; and Seymore, K, Building Domain-Specific Search Engines with Machine Learning Techniques, 1999. Proc. AAAI-99 Spring Symposium on Intelligent Agents in Cyberspace.

Maltz, D., and Ehrlich, K., Pointing The Way: Active Collaborative Filtering, 1995. Proc. ACM SIGCHI Conference, Published in the Proceedings of the CHI '95, May 1995.

Great Britain Search Report for corresponding patent application No. GB 0227454.6, dated May 6, 2003, 1 page.

* cited by examiner

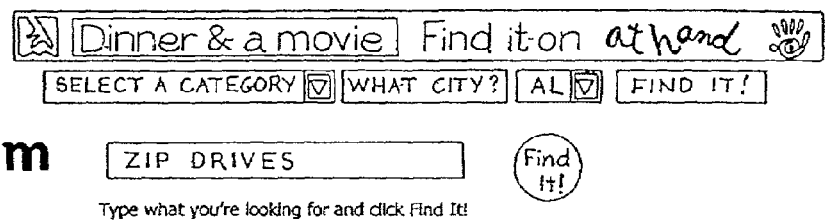

RECOMMENDING SEARCH TERMS USING COLLABORATIVE FILTERING AND WEB SPIDERING

RELATED APPLICATIONS

This application is a continuation in part of application Ser. No. 09/911,674 entitled SYSTEM AND METHOD FOR INFLUENCING A POSITION ON A SEARCH RESULT LIST GENERATED BY A COMPUTER NETWORK SEARCH ENGINE, filed on Jul. 24, 2001 in the names Davis, et al., which application is commonly assigned with the present application and incorporated herein in its entirety by this reference and which is a continuation of application Ser. No. 09/322,677, filed May 28, 1999, in the names of Darren J. Davis, et al., now U.S. Pat. No. 6,269,361.

REFERENCE TO COMPUTER PROGRAM LISTINGS SUBMITTED ON COMPACT DISK

A compact disc appendix is included containing computer program code listings pursuant to 37 C.F.R. 1.52(e) and is hereby incorporated by reference in its entirety. The total number of compact discs is 1 including 37,913 files and 539,489,774 bytes. The files included on the compact disc are listed in a file entitled "dir_s" on the compact disc. Because of the large number of files contained on the compact disc, the required listing of file names, dates of creation and sizes in bytes is included in the file dir_s on the compact disk and incorporated by reference herein.

BACKGROUND

U.S. Pat. No. 6,269,361 discloses a database having accounts for advertisers. Each account contains contact and billing information for an advertiser. In addition, each account contains at least one search listing having at least three components: a description, a search term comprising one or more keywords, and a bid amount. The advertiser may add, delete, or modify a search listing after logging into his or her account via an authentication process. The advertiser influences a position for a search listing in the advertiser's account by first selecting a search term relevant to the content of the web site or other information source to be listed. The advertiser enters the search term and the description into a search listing. The advertiser influences the position for a search listing through a continuous online competitive bidding process. The bidding process occurs when the advertiser enters a new bid amount, which is preferably a money amount, for a search listing. The disclosed system then compares this bid amount with all other bid amounts for the same search term, and generates a rank value for all search listings having that search term. The rank value generated by the bidding process determines where the advertiser's listing will appear on the search results list page that is generated in response to a query of the search term by a searcher or user on the computer network. A higher bid by an advertiser will result in a higher rank value and a more advantageous placement. This system is known as a pay-for-placement search engine.

Thus, when a user performs a search on a pay-for-placement search engine, the results are conventionally sorted based on how much each advertiser has bid on the user's search term. Because different users will use different words to find the same information, it is important for an advertiser to bid on a wide variety of search terms in order to maximize the traffic to his site. The better and more extensive an advertiser's list of search terms, the more traffic the advertiser will see.

As an example, a seafood vendor will want to bid not only on the word "seafood", but also on terms like "fish", "tuna", "halibut", and "fresh fish". A well thought out list will often contain hundreds of terms. Good search terms have three significant properties: they are appropriate to the advertiser's site, they are popular enough that many users are likely to search on them, and they provide good value in terms of the amount the advertiser must bid to get a high ranking in the search results. An advertiser willing to take the time to consider all these factors will get good results.

Unfortunately, few advertisers understand how to create a good list of search terms, and right now there are only limited tools to help them. The typical state of the art is the Search Term Suggestion Tool (STST) provided by Overture Services, Inc., located on the Internet at an internal page of overture.com. STST provides suggestions based on string matching. Given a word, STST returns a sorted list of all the search terms that contain that word. This list is sorted by how often users have searched for the terms in the past month. In the seafood example, if the advertiser enters the word "fish", his results will include terms like "fresh fish," "fish market," "tropical fish," and "fish bait," but not words like "tuna" or "halibut" because they do not contain the string "fish." To create his initial list of search terms, a new advertiser will often enter a few words into STST and then bid on all of the terms that it returns.

There are three problems with this approach. First, although STST finds many good terms like "fresh fish" and "fish market," it also finds many bad terms like "fishing," "tropical fish," and "fish bait" that have no relation to the advertiser's site. These create extra work for the search engine provider, since its editorial staff must filter out inappropriate terms that an advertiser submits. Second, STST misses many good terms like "tuna" and "halibut." These result in lost traffic for the advertiser and less revenue for the provider, since every bid helps to drive up the price for search terms and increase the provider's revenue. Third, it is easy for an advertiser to simply overlook a word that he should enter into STST, thereby missing a whole space of search terms that are appropriate for his site. These missed terms also result in lost traffic for the advertiser and less revenue for the provider.

An improved version of STST is the GoTo Super Term Finder (STF) which may be found at an internal web page of idealab.com, users.idealab.com/~charlie/advertisers/start.html. This tool keeps track of two lists: an accept list of good words for an advertiser's site, and a reject list of bad words or words that have no relation to the advertiser's site or its content. STF displays a sorted list of all the search terms that contain a word in the first list, but not in the second list. As with STST, the result list is sorted by how often users have searched for the terms in the past month. In the seafood example, if the accept list contains the word "fish," and the reject list contains the word "bait," then the output will display terms like "fresh fish" and "tropical fish" but not "fish bait." An advertiser can use this output to refine his accept and reject lists in an iterative process.

Although STF is an improvement over STST, it still suffers from similar problem. In the seafood example, many search terms contain the word "fish" that are irrelevant to a seafood site. The advertiser must still manually identify these and reject each one. Unless the rejected terms share common words, the amount of work the advertiser must do with STF is the same as with STST. Both tools also share the weakness of not being able to identify good search terms like "tuna" or "halibut". There may be many such semantically related terms; they may even appear commonly on the advertiser's web site. But the burden is still on the advertiser to think of each one. The problem with STST and STF is that they both look for search terms based on syntactic properties, and they force the advertiser to think of the root words himself. There is a clear need for a better approach, one that takes into account the meaning of words and that can identify them automatically by looking at an advertiser's web site.

A system that finds semantically related terms is Wordtracker, which may be found at wordtracker.com. Given a search term, Wordtracker recommends new terms in two ways. First, Wordtracker recommends words by looking them up in a thesaurus. Second, Wordtracker recommends words by searching for them using an algorithm called lateral search. Lateral search runs the original search term through two popular web search engines. It then downloads the top 200 web page results, extracts all the terms from the KEYWORD and DESCRIPTION meta tags for the pages and returns a list sorted by how frequently each term appears in these tags.

Wordtracker is only a marginal improvement over STST and STF. In the seafood example, if an advertiser searches for the word "fish" he is very likely to see results that include "tuna" and "halibut" but he will still see bad terms like "tropical fish" and "fish bait" that are not relevant to his site. A more specific search for "seafood" will get rid of some of these bad terms, but introduce others like "restaurant" and "steak" that come from seafood restaurants. Unlike with STF, there is no way to reject such bad terms and refine the search. Nor is there a way to provide a broad list of good terms, since the web search engines work poorly with more than one search term. These two limitations are significant, since it is very rare that an advertiser can identify a single search term that exactly describes his site and others like it. Wordtracker also suffers from the problem that meta keywords are not always indicative of a web site. There is no editorial review, so web site designers often include spurious keywords in an attempt to make their pages more prominent on search engines. The search engines themselves are also limited, and can return many pages in their list of 200 that are irrelevant to an advertiser's site. Finally, like STST and STF, Wordtracker still requires an advertiser to think of his own search terms to get started.

Given these shortcomings, there is a clear need for a better tool, one that can find all of the good search terms for an advertiser's site while getting rid of the bad ones.

BRIEF SUMMARY

By way of introduction only, the present embodiments make search term recommendations in one or more of two ways. A first technique involves looking for good search terms directly on an advertiser's web site. A second technique involves comparing an advertiser to other, similar advertisers and recommending the search terms the other advertisers have chosen. The first technique is called spidering and the second technique is called collaborative filtering. In the preferred embodiment, the output of the spidering step is used as input to the collaborative filtering step. The final output of search terms from both steps is then interleaved in a natural way.

The foregoing discussion of the preferred embodiments has been provided only by way of introduction. Nothing in this section should be taken as a limitation of the claims, which define the scope of the invention.

BRIEF DESCRIPTION OF SEVERAL VIEWS OF THE DRAWINGS

FIG. 7 illustrates an example of a search result list generated by one embodiment of the present invention;

FIGS. 15–17 are flow diagrams illustrating computation of the Pearson correlation between two advertisers.

DETAILED DESCRIPTION OF THE PRESENTLY PREFERRED EMBODIMENTS

Methods and systems for generating a pay-for-performance search result determined by a site promoter, such as an advertiser, over a client/server based computer network system are disclosed. The following description is presented to enable any person skilled in the art to make and use the invention. For purposes of explanation, specific nomenclature is set forth to provide a thorough understanding of the present invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
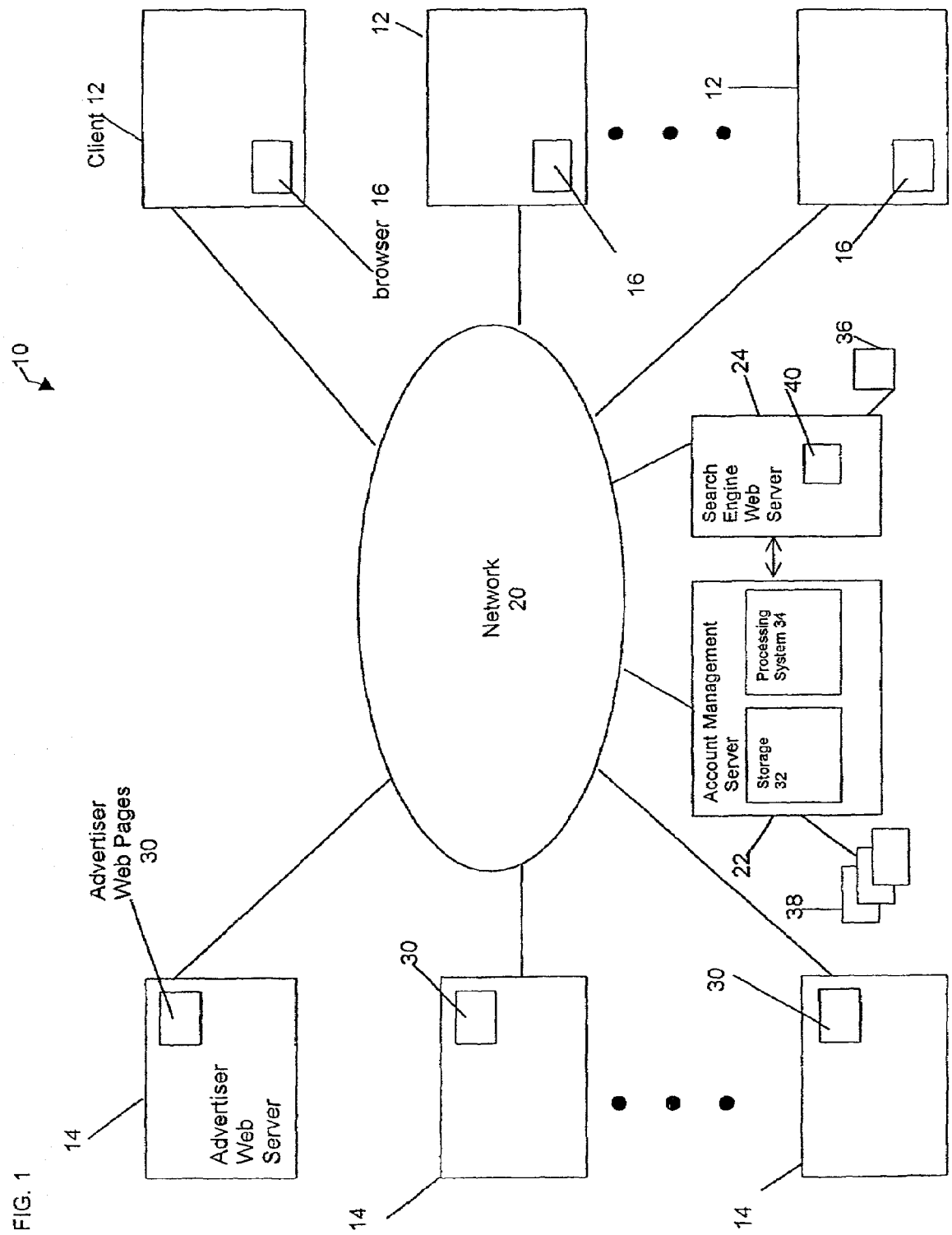
FIG. 1 is a block diagram illustrating the relationship between a large network and one embodiment of the system and method for generating a pay-for-performance search result of the present invention.

Referring now to the drawings, FIG. 1 is an example of a distributed system 10 configured as client/server architecture used in a preferred embodiment of the present invention. A "client" is a member of a class or group that uses the services of another class or group to which it is not related. In the context of a computer network, such as the Internet, a client is a process (i.e. roughly a program or task) that requests a service which is provided by another process, known as a server program. The client process uses the requested service without having to know any working details about the other server program or the server itself. In networked systems, a client process usually runs on a computer that accesses shared network resources provided by another computer running a corresponding server process. However, it should also be noted that it is possible for the client process and the server process to run on the same computer.

A "server" is typically a remote computer system that is accessible over a communications medium such as the Internet. The client process may be active in a second computer system, and communicate with the server process over a communications medium that allows multiple clients to take advantage of the information-gathering capabilities of the server. Thus, the server essentially acts as an information provider for a computer network.

The block diagram of FIG. 1 therefore shows a distributed system 10 comprising a plurality of client computers 12, a plurality of advertiser web servers 14, an account management server 22, and a search engine web server 24, all of which are connected to a network 20. The network 20 will be hereinafter generally referred to as the Internet. Although the system and method of the present invention is specifically useful for the Internet, it should be understood that the client computers 12, advertiser web servers 14, account management server 22, and search engine web server 24 may be connected together through one of a number of different types of networks. Such networks may include local area networks (LANs), other wide area networks (WANs), and regional networks accessed over telephone lines, such as commercial information services. The client and server processes may even comprise different programs executing simultaneously on a single computer.

The client computers 12 can be conventional personal computers (PCs), workstations, or computer systems of any other size. Each client 12 typically includes one or more processors, memories, input/output devices, and a network interface, such as a conventional modem. The advertiser web servers 14, account management server 22, and the search engine web server 24 can be similarly configured. However, advertiser web servers 14, account management server 22, and search engine web server 24 may each include many computers connected by a separate private network. In fact, the network 20 may include hundreds of thousands of individual networks of computers.

The client computers 12 can execute web browser programs 16, such as the NAVIGATOR, EXPLORER, or MOSAIC browser programs, to locate the web pages or records 30 stored on advertiser server 14. The browser programs 16 allow the users to enter addresses of specific web pages 30 to be retrieved. These addresses are referred to as Uniform Resource Locators, or URLs. In addition, once a page has been retrieved, the browser programs 16 can provide access to other pages or records when the user "clicks" on hyperlinks to other web pages. Such hyperlinks are located within the web pages 30 and provide an automated way for the user to enter the URL of another page and to retrieve that page. The pages can be data records including as content plain textual information, or more complex digitally encoded multimedia content, such as software programs, graphics, audio signals, videos, and so forth.

In a preferred embodiment of the present invention, shown in FIG. 1, client computers 12 communicate through the network 20 with various network information providers, including account management server 22, search engine server 24, and advertiser servers 14 using the functionality provided by a HyperText Transfer Protocol (HTTP), although other communications protocols, such as FTP, SNMP, TELNET, and a number of other protocols known in the art, may be used. Preferably, search engine server 24, account management server 22, and advertiser servers 14 are located on the World Wide Web.

As discussed above, at least two types of server are contemplated in a preferred embodiment of the present invention. The first server contemplated is an account management server 22 comprising a computer storage medium 32 and a processing system 34. A database 38 is stored on the storage medium 32 of the account management server 22. The database 38 contains advertiser account information. It will be appreciated from the description below that the system and method of the present invention may be implemented in software that is stored as executable instructions on a computer storage medium, such as memories or mass storage devices, on the account management server 22. Conventional browser programs 16, running on client computers 12, may be used to access advertiser account information stored on account management server 22. Preferably, access to the account management server 22 is accomplished through a firewall, not shown, which protects the account management and search result placement programs and the account information from external tampering. Additional security may be provided via enhancements to the standard communications protocols such as Secure HTTP or the Secure Sockets Layer.

The second server type contemplated is a search engine web server 24. A search engine program permits network users, upon navigating to the search engine web server URL or sites on other web servers capable of submitting queries to the search engine web server 24 through their browser program 16, to type keyword queries to identify pages of interest among the millions of pages available on the World Wide Web. In a preferred embodiment of the present invention, the search engine web server 24 generates a search result list that includes, at least in part, relevant entries obtained from and formatted by the results of the bidding process conducted by the account management server 22. The search engine web server 24 generates a list of hypertext links to documents that contain information relevant to search terms entered by the user at the client computer 12. The search engine web server transmits this list, in the form of a web page, to the network user, where it is displayed on the browser 16 running on the client computer 12. A presently preferred embodiment of the search engine web server may be found by navigating to the web page at URL goto.com. In addition, the search result list web page, an example of which is presented in FIG. 7, will be discussed below in further detail.

Search engine web server 24 is connected to the Internet 20. In a preferred embodiment of the present invention, search engine web server 24 includes a search database 40 comprised of search listing records used to generate search results in response to user queries. In addition, search engine web server 24 may also be connected to the account management server 22. Account management server 22 may also be connected to the Internet. The search engine web server 24 and the account management server 22 of the present invention address the different information needs of the users located at client computers 12.

For example, one class of users located at client computers 12 may be network information providers such as advertising web site promoters or owners having advertiser web pages 30 located on advertiser web servers 14. These advertising web site promoters, or advertisers, may wish to access account information residing in storage 32 on account management server 22. An advertising web site promoter may, through the account residing on the account management server 22, participate in a competitive bidding process with other advertisers. An advertiser may bid on any number of search terms relevant to the content of the advertiser's web site. In one embodiment of the present invention, the relevance of a bidded search term to an advertiser's web site is determined through a manual editorial process prior to insertion of the search listing containing the search term and advertiser web site URL into the database 40. In an alternate embodiment of the present invention, the relevance of a bidded search term in a search listing to the corresponding web site may be evaluated using a computer program executing at processor 34 of account management server 22, where the computer program will evaluate the search term and corresponding web site according to a set of predefined editorial rules.

The higher bids receive more advantageous placement on the search result list page generated by the search engine 24 when a search using the search term bid on by the advertiser is executed. In a preferred embodiment of the present invention, the amount bid by an advertiser comprises a money amount that is deducted from the account of the advertiser for each time the advertiser's web site is accessed via a hyperlink on the search result list page. A searcher "clicks" on the hyperlink with a computer input device to initiate a retrieval request to retrieve the information associated with the advertiser's hyperlink. Preferably, each access or "click" on a search result list hyperlink will be redirected to the search engine web server 24 to associate the "click" with the account identifier for an advertiser. This redirect action, which is not apparent to the searcher, will access account identification information coded into the search result page before accessing the advertiser's URL using the search result list hyperlink clicked on by the searcher. The account identification information is recorded in the advertiser's account along with information from the retrieval request as a retrieval request event. Since the information obtained through this mechanism conclusively matches an account identifier with a URL in a manner not possible using conventional server system logs known in the art, accurate account debit records will be maintained. Most preferably, the advertiser's web site description and hyperlink on the search result list page is accompanied by an indication that the advertiser's listing is a paid listing. Most preferably, each paid listing displays a "cost to advertiser," which is an amount corresponding to a "price-per-click" paid by the advertiser for each referral to the advertiser's site through the search result list.

A second class of users at client computers 12 may comprise searchers seeking specific information on the web. The searchers may access, through their browsers 16, a search engine web page 36 residing on web server 24. The search engine web page 36 includes a query box in which a searcher may type a search term comprising one or more keywords. Alternatively, the searcher may query the search engine web server 24 through a query box hyperlinked to the search engine web server 24 and located on a web page stored at a remote web server. When the searcher has finished entering the search term, the searcher may transmit the query to the search engine web server 24 by clicking on a provided hyperlink. The search engine web server 24 will then generate a search result list page and transmit this page to the searcher at the client computer 12.

The searcher may click on the hypertext links associated with each listing on the search results page to access the corresponding web pages. The hypertext links may access web pages anywhere on the Internet, and include paid listings to advertiser web pages 18 located on advertiser web servers 14. In a preferred embodiment of the present invention, the search result list also includes non-paid listings that are not placed as a result of advertiser bids and are generated by a conventional World Wide Web search engine, such as the INKTOMI, LYCOS, or YAHOO! search engines. The non-paid hypertext links may also include links manually indexed into the database 40 by an editorial team. Most preferably, the non-paid listings follow the paid advertiser listings on the search results page.

Figure 2:
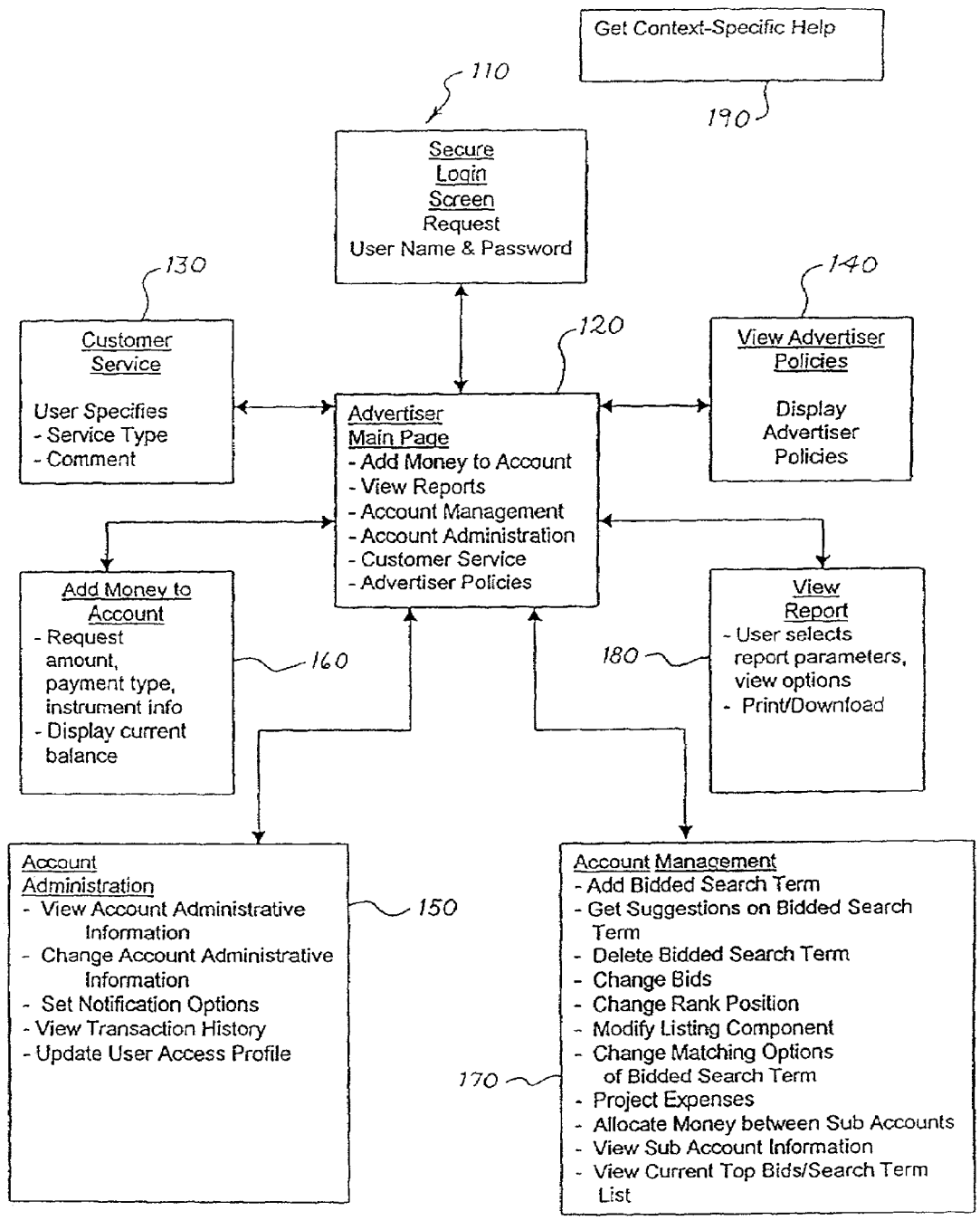
FIG. 2 is a chart of menus, display screens, and input screens used in one embodiment of the present invention.

FIG. 2 is a diagram showing menus, display screens, and input screens presented to an advertiser accessing the account management server 22 through a conventional browser program 16. The advertiser, upon entering the URL of the account management server 22 into the browser program 16 of FIG. 1, invokes a login application, discussed below as shown at screen 110 of FIG. 2, running on the processing system 34 of the server 22. Once the advertiser is logged-in, the processing system 34 provides a menu 120 that has a number of options and further services for advertisers. These items, which will be discussed in more detail below, cause routines to be invoked to either implement the advertiser's request or request further information prior to implementing the advertiser's request. In one embodiment of the present invention, the advertiser may access several options through menu 120, including requesting customer service 130, viewing advertiser policies 140, performing account administration tasks 150, adding money to the advertiser's account 160, managing the account's advertising presence on the search engine 170, and viewing activity reports 180. Context-specific help 190 may also generally be available at menu 120 and all of the above-mentioned options.

Figure 3:
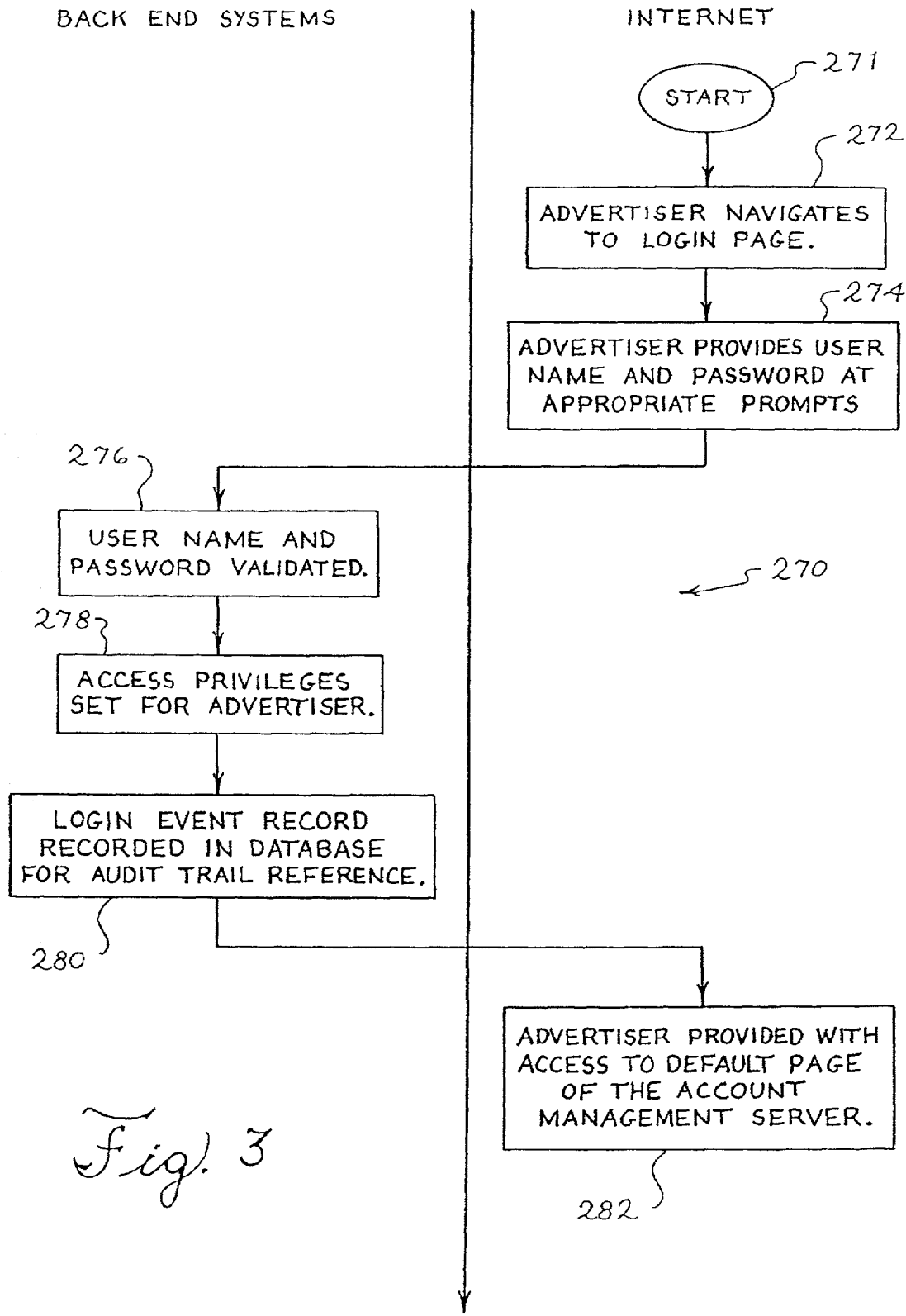
FIG. 3 is a flow chart illustrating the advertiser user login process performed in one embodiment of the present invention.
Figure 4:
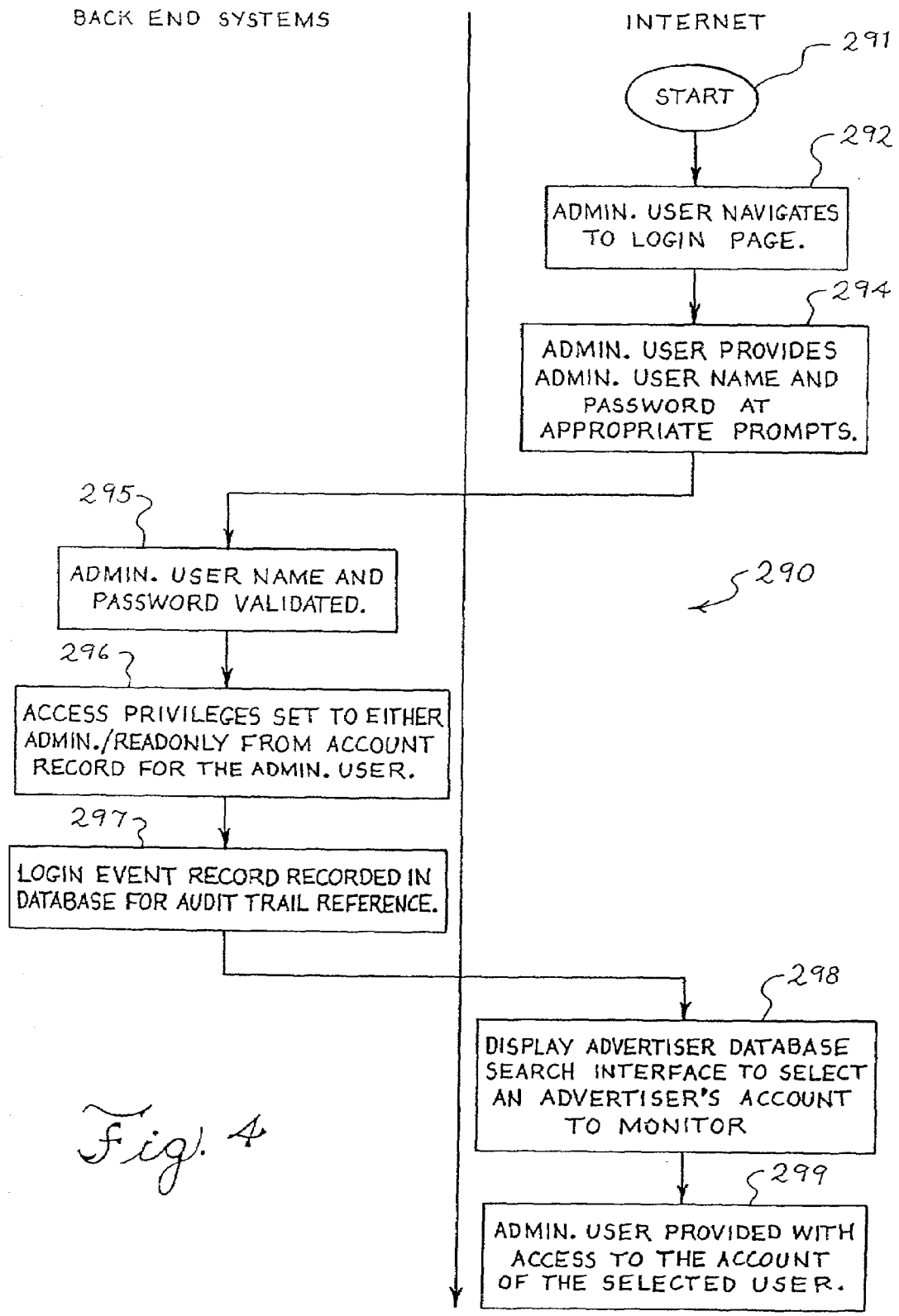
FIG. 4 is a flow chart illustrating the administrative user login process performed in one embodiment of the present invention.

The login procedure of the preferred embodiment of the present invention is shown in FIGS. 3 and 4 for two types of user. FIG. 3 shows the login procedures 270 for an advertiser. FIG. 4 shows the login procedures 290 for an administrator managing and maintaining the system and method of the present invention. As discussed above, the advertiser or administrator at a client computer 12 must first use a browser program at steps 271 or 291 to access the account management server. After the advertiser navigates to the URL of the login page to start the login process at step 272 or 292, the processing system 34 of the account management server 22 invokes a login application at steps 274 or 294. According to this application, the processor provides an input screen 110 (FIG. 2) that requests the advertiser's or administrator's user name and password. These items of information are provided at steps 276 or 296 to a security application known in the art for the purpose of authentication, based on the account information stored in a database stored in storage 32 of account management server 22.

According to FIG. 3, after the user has been authenticated as an advertiser, the advertiser is provided with the menu screen 120 of FIG. 2 and limited read/write access privileges only to the corresponding advertiser account, as shown in step 278. The advertiser login event 278 may also be recorded in step 280 in an audit trail data structure as part of the advertiser's account record in the database. The audit trail is preferably implemented as a series of entries in database 38, where each entry corresponds to an event wherein the advertiser's account record is accessed. Preferably, the audit trail information for an account record may be viewed by the account owner and other appropriate administrators.

However, if the user is authenticated as an administrator in step 295 of FIG. 4, the administrator is provided with specified administrative access privileges to all advertiser accounts as shown in step 296. The administrator login event 296 is recorded in step 297 in the audit trail data structure portion of the administrator's account record. This audit trail is preferably implemented as a series of entries in database 38, where each entry corresponds to an event wherein the administrator's account record is accessed. Most preferably, the administrator's audit trail information may be viewed by the account owner and other appropriate administrators.

Furthermore, instead of the general advertiser main menu shown to the authenticated advertiser users in step 282, the authenticated administrator is provided in step 298 with access to search the database 38 of advertiser accounts. Preferably, a database search interface is provided to the administrator that enables the administrator to select an advertiser account to monitor. For example, the interface may include query boxes in which the administrator may enter an account number or username or contact name corresponding to an account the administrator wishes to access. When the administrator selects an advertiser account to monitor in step 299, the administrator is then brought to the main advertiser page 120 of FIG. 2, which is also seen by the advertisers.

Access to the account information 32 located on the account management server 22 is restricted to users having an account record on the system, as only those users are provided with a valid login name and password. Password and login name information is stored along with the user's other account information in the database 38 of the account management server 22, as shown in FIG. 1. Account information, including a login user name and password, is entered in the database 38 of FIG. 1 via a separate online registration process that is outside the scope of the present invention.

Figure 5:
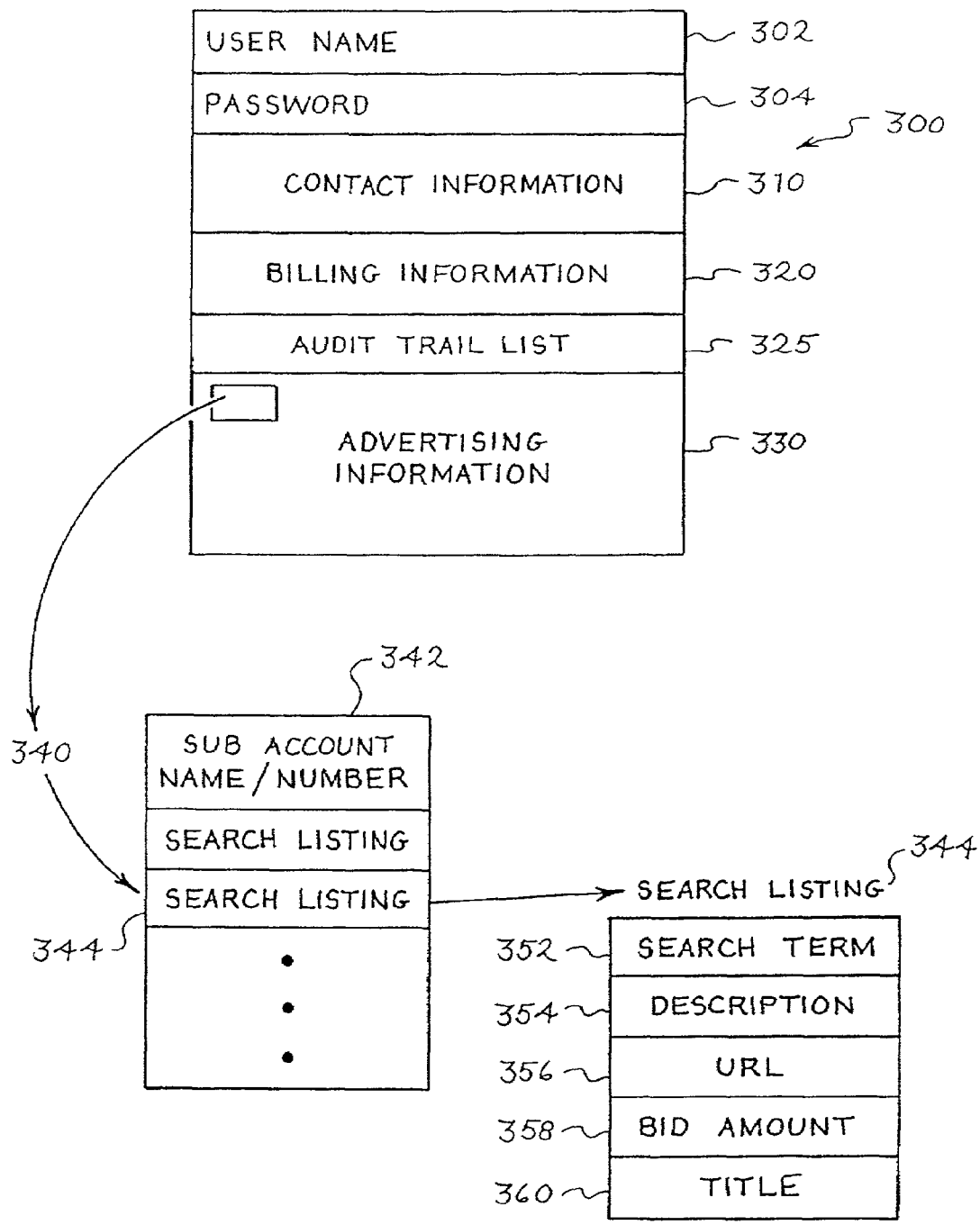
FIG. 5 is a diagram of data for an account record for use with one embodiment of the present invention.

FIG. 5 is a diagram showing the types of information contained in each advertiser account record 300 in the database. First, an advertiser account record 300 contains a username 302 and a password 304, used for online authentication as described above. The account record also contains contact information 310 (e.g., contact name, company name, street address, phone, e-mail address).

Contact information 310 is preferably utilized to direct communications to the advertiser when the advertiser has requested notification of key advertiser events under the notification option, discussed below. The account record 300 also contains billing information 320 (e.g., current balance, credit card information). The billing information 320 contains data accessed when the advertiser selects the option to add money to the advertiser's account. In addition, certain billing information, such as the current balance, may trigger events requiring notification under the notification option. The audit trail section 325 of an account record 300 contains a list of all events wherein the account record 300 is accessed. Each time an account record 300 is accessed or modified, by an administrator or advertiser a short entry describing the account access and/or modification event will be appended to the audit trail section 330 of the administrator or advertiser account that initiated the event. The audit trail information may then be used to help generate a history of transactions made by the account owner under the account.

The advertising information section 330 contains information needed to conduct the online bidding process of the present invention, wherein a position is determined for a web site description and hyperlink within a search result list generated by a search engine. The advertising data 330 for each user account 300 may be organized as zero or more subaccounts 340. Each subaccount 340 comprises at least one search listing 344. Each search listing corresponds to a bid on a search term. An advertiser may utilize subaccounts to organize multiple bids on multiple search terms, or to organize bids for multiple web sites. Subaccounts are also particularly useful for advertisers seeking to track the performance of targeted market segments. The subaccount superstructure is introduced for the benefit of the advertisers seeking to organize their advertising efforts, and does not affect the method of operation of the present invention. Alternatively, the advertising information section need not include the added organizational layer of subaccounts, but may simply comprise one or more search listings.

The search listing 344 corresponds to a search term/bid pairing and contains key information to conduct the online competitive bidding process. Preferably, each search listing comprises the following information: search term 352, web site description 354, URL 356, bid amount 358, and a title 360. The search term 352 comprises one or more keywords which may be common words in English (or any other language). Each keyword in turn comprises a character string. The search term is the object of the competitive online bidding process. The advertiser selects a search term to bid on that is relevant to the content of the advertiser's web site. Ideally, the advertiser may select a search term that is targeted to terms likely to be entered by searchers seeking the information on the advertiser's web site, although less common search terms may also be selected to ensure comprehensive coverage of relevant search terms for bidding.

The web site description 354 is a short textual description (preferably less than 190 characters) of the content of the advertiser's web site and may be displayed as part of the advertiser's entry in a search result list. The search listing 344 may also contain a title 360 of the web site that may be displayed as the hyperlinked heading to the advertiser's entry in a search result list. The URL 356 contains the Uniform Resource Locator address of the advertiser's web site. When the user clicks on the hyperlink provided in the advertiser's search result list entry, the URL is provided to the browser program. The browser program, in turn, accesses the advertiser's web site through the redirection mechanism discussed above. The URL may also be displayed as part of the advertiser's entry in a search result list.

The bid amount 358 preferably is a money amount bid by an advertiser for a listing. This money amount is deducted from the advertiser's prepaid account or is recorded for advertiser accounts that are invoiced for each time a search is executed by a user on the corresponding search term and the search result list hyperlink is used to refer the searcher to the advertiser's web site. Finally, a rank value is a value generated dynamically, preferably by the processing system 34 of the account management server 22 shown in FIG. 1, each time an advertiser places a bid or a search enters a search query. The rank value of an advertiser's search listing determines the placement location of the advertiser's entry in the search result list generated when a search is executed on the corresponding search term. Preferably, rank value is an ordinal value determined in a direct relationship to the bid amount 358; the higher the bid amount, the higher the rank value, and the more advantageous the placement location on the search result list. Most preferably, the rank value of 1 is assigned to the highest bid amount with successively higher ordinal values (e.g., 2, 3, 4, . . . ) associated with successively lower ranks and assigned to successively lower bid amounts.

Once logged in, an advertiser can perform a number of straightforward tasks set forth in menu 120 of FIG. 2, including viewing a list of rules and policies for advertisers, and requesting customer service assistance. These items cause routines to be invoked to implement the request. For example, when "Customer Service" is selected, an input screen 130 is displayed to allow the advertiser to select the type of customer service requested. In addition, forms may be provided on screen 130 so that an advertiser may type a customer comment into a web-based input form.

When "View Advertiser Policies" is selected, a routine will be invoked by processing system 34 of the account management server 22 FIG. 1. As shown in FIG. 2, the routine will display an informational web page 140. The web page 140 sets forth the advertiser policies currently in effect (e.g., "All search listing descriptions must clearly relate to the search term").

Menu 120 of FIG. 2 also includes an "Account Administration" selection 150 which allows an advertiser, among other things, to view and change the advertiser's contact information and billing information, or update the advertiser's access profile, if any. Web-based forms well known in the art and similar to those discussed above are provided for updating account information.

The "Account Administration" menu also includes a selection enabling an advertiser to view the transaction history of the advertiser's account. Under the "View Transaction History" selection, the advertiser may invoke routines to view a listing of past account transactions (e.g., adding money to account, adding or deleting bidded search terms, or changing a bid amount). Additional routines may be implemented to permit advertisers to display a history of transactions of a specified type, or that occur within a specified time. The transaction information may be obtained from the audit trail list 325 of FIG. 5, described above. Clickable buttons that may be implemented in software, web-based forms, and/or menus may be provided as known in the art to enable advertisers to specify such limitations.

In addition, the "Account Administration" menu 150 of FIG. 2 includes a selection enabling an advertiser to set notification options. Under this selection, the advertiser may select options that will cause the system to notify the advertiser when certain key events have occurred. For example, the advertiser may elect to set an option to have the system send conventional electronic mail messages to the advertiser when the advertiser's account balance has fallen below a specified level. In this manner, the advertiser may receive a "warning" to replenish the account before the account is suspended (meaning the advertiser's listings will no longer appear in search result lists). Another key event for which the advertiser may wish notification is a change in position of an advertiser's listing in the search result list generated for a particular search term. For example, an advertiser may wish to have the system send a conventional electronic mail message to the advertiser if the advertiser has been outbid by another advertiser for a particular search term (meaning that the advertiser's listing will appear in a position farther down on the search result list page than previously). When one of the system-specified key events occurs, a database search is triggered for each affected search listing. The system will then execute the appropriate notification routine in accordance with the notification options specified in the advertiser's account.

Referring back to FIG. 2, a selection also appears in menu 120 that permits an advertiser to add money to the advertiser's account, so that the advertiser will have funds in their account to pay for referrals to the advertiser's site through the search results page. Preferably, only advertisers with funds in their advertiser's accounts may have their paid listings included in any search result lists generated. Most preferably, advertisers meeting selected business criteria may elect, in place of maintaining a positive account balance at all times, incur account charges regardless of account balance and pay an invoiced amount at regular intervals which reflects the charges incurred by actual referrals to the advertiser's site generated by the search engine. The process that is executed when the "Add Money to Account" selection is invoked is shown in further detail in FIG. 6, beginning at step 602. When the "Add Money to Account" selection is clicked in step 604, a function is invoked which receives data identifying the advertiser and retrieves the advertiser's account from the database. The executing process then stores the advertiser's default billing information and displays the default billing information for the advertiser in step 606. The displayed billing information includes a default amount of money to be added, a default payment type, and default instrument information.

In the preferred embodiment of the present invention, an advertiser may add funds online and substantially in real time through the use of a credit card, although the use of other payment types are certainly well within the scope of the present invention. For example, in an alternate embodiment of the present invention, advertisers may add funds to their account by transferring the desired amount from the advertiser's bank account through an electronic funds verification mechanism known in the art such as debit cards, in a manner similar to that set forth in U.S. Pat. No. 5,724,424 to Gifford. In another alternate embodiment of the present invention, advertisers can add funds to their account using conventional paper-based checks. In that case, the additional funds may be updated in the account record database through manual entry. The instrument information includes further details regarding the type of payment. For example, for a credit card, the instrument information may include data on the name of the credit card (e.g., MasterCard, Visa, or American Express), the credit card number, the expiration date of the credit card, and billing information for the credit card (e.g., billing name and address). In a preferred embodiment of the present invention, only a partial credit card number is displayed to the advertiser for security purposes.

The default values displayed to the advertiser are obtained from a persistent state, e.g., stored in the account database. In an embodiment of the present invention, the stored billing information values may comprise the values set by the advertiser the last (e.g. most recent) time the process of adding money was invoked and completed for the advertiser's account. The default billing information is displayed to the advertiser in a web-based form. The advertiser may click on the appropriate text entry boxes on the web-based form and make changes to the default billing information. After the advertiser completes the changes, the advertiser may click on a hyperlinked "Submit" button provided on the form to request that the system update the billing information and current balance in step 608. Once the advertiser has requested an update, a function is invoked by the system which validates the billing information provided by the advertiser and displays it back to the advertiser for confirmation, as shown in step 610. The confirmation billing information is displayed in read-only form and may not be changed by the advertiser.

The validation step functions as follows. If payment is to be debited from an advertiser's external account, payment may be authenticated, authorized and completed using the system set forth in U.S. Pat. No. 5,724,424 to Gifford. However, if the payment type is by credit card, a validating algorithm is invoked by the system, which validates the credit card number using a method such as that set forth in U.S. Pat. No. 5,836,241 to Stein et al. The validating algorithm also validates the expiration date via a straightforward comparison with the current system date and time. In addition, the function stores the new values in a temporary instance prior to confirmation by the advertiser.

Once the advertiser ascertains that the displayed data is correct, the advertiser may click on a "Confirm" button provided on the page to indicate that the account should be updated in step 612. In step 612, a function is invoked by the system which adds money to the appropriate account balance, updates the advertiser's billing information, and appends the billing information to the advertiser's payment history. The advertiser's updated billing information is stored to the persistent state (e.g., the account record database) from the temporary instance.

Within the function invoked at step 612, a credit card payment function may be invoked by the system at step 614. In an alternate embodiment of the present invention, other payment functions such as debit card payments may be invoked by defining multiple payment types depending on the updated value of the payment type.

If the payment type is credit card, the user's account is credited immediately at step 616, the user's credit card having already been validated in step 610. A screen showing the status of the add money transaction is displayed, showing a transaction number and a new current balance, reflecting the amount added by the just-completed credit card transaction.

In an alternate embodiment of the present invention, after the money has been added to the account, the amount of money added to the account may be allocated between subaccounts the end of the add money process at step 616. If the advertiser has no subaccounts, all of the money in the account is a general allocation. However, if the advertiser has more than one subaccount, the system will display a confirmation and default message prompting the advertiser to "Allocate Money Between Subaccounts".

Figure 6:
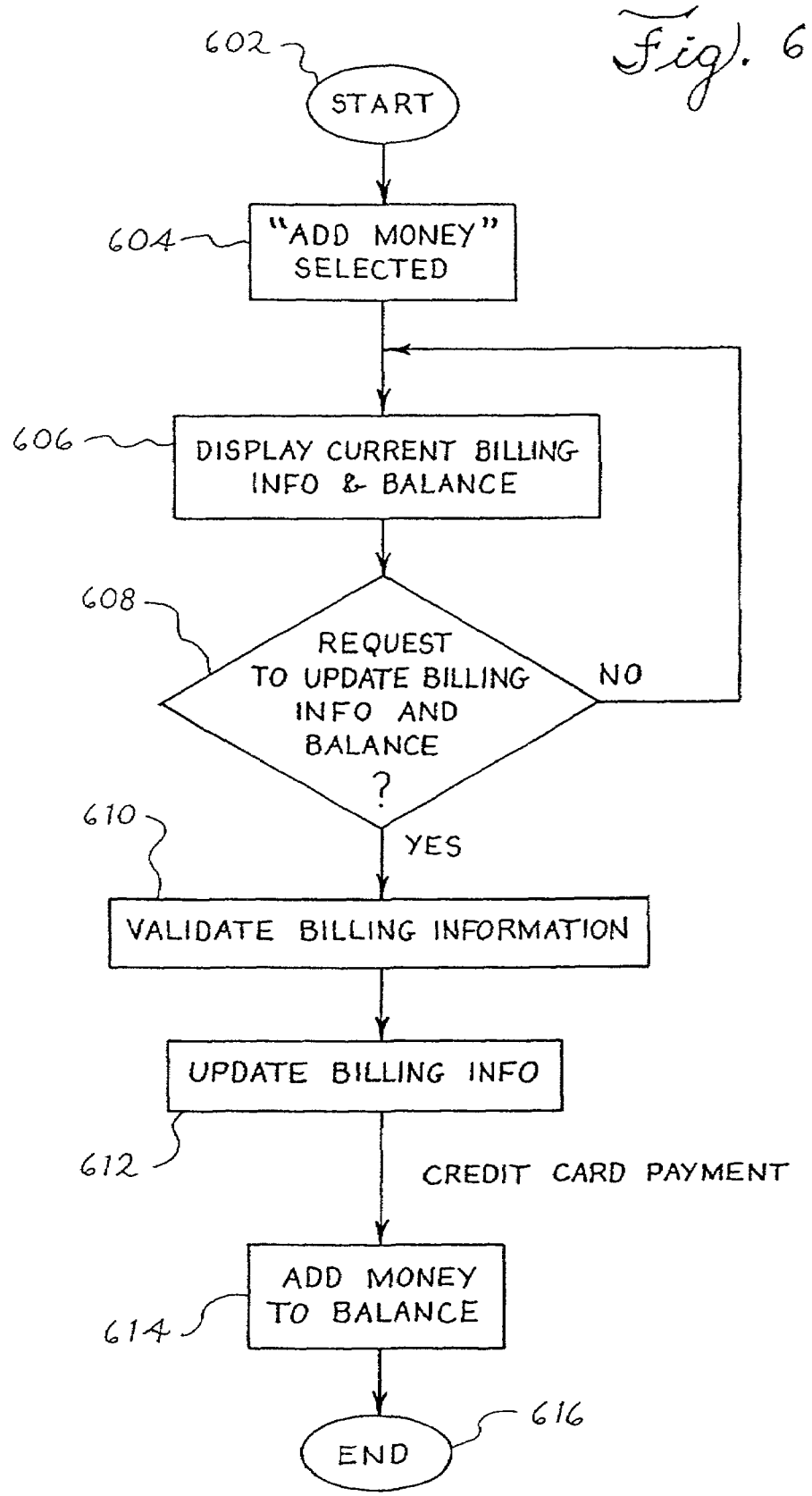
FIG. 6 is a flow chart illustrating a method of adding money to an account record used in one embodiment of the present invention.

The menu selection "Allocate Money Between Subaccounts" may be invoked when money is added to the advertiser account after step 616 of FIG. 6, or it may be invoked within the "Account Management" menu 170 shown in FIG. 2. The "Account Management" menu 170 is accessible from the Advertiser Main Page 120, as shown in FIG. 2. This "Allocate Money Between Subaccounts" menu selection permits an advertiser to allocate current and any pending balances of the advertiser's account among the advertiser's subaccounts. The system will then update the subaccount balances. The current balance allocations will be made in real time, while the pending balance allocations will be stored in the persistent state. A routine will be invoked to update the subaccount balances to reflect the pending balance allocations when the payment for the pending balance is processed. Automatic notification may be sent to the advertiser at that time, if requested. This intuitive online account management and allocation permits advertisers to manage their online advertising budget quickly and efficiently. Advertisers may replenish their accounts with funds and allocate their budgets, all in one easy web-based session. The computer-based implementation eliminates time consuming, high cost manual entry of the advertiser's account transactions.

The "Allocate Money Between Subaccounts" routine begins when an advertiser indicates the intent to allocate money by invoking the appropriate menu selection at the execution points indicated above. When the advertiser indicates the intent to allocate, a function is invoked by the system to determine whether there are funds pending in the current balance (i.e., unactivated account credits) that have not yet been allocated to the advertiser's subaccounts, and displays the balance selection options. In a preferred embodiment of the present invention, an account instance is created and a pending current balance account field is set from the persistent state.

If there are no unallocated pending funds, the system may display the current available balances for the account as a whole as well as for each subaccount. The advertiser then distributes the current available balance between subaccounts and submits a request to update the balances. A function is invoked which calculates and displays the current running total for subaccount balances. The current running total is stored in a temporary variable which is set to the sum of current balances for all subaccounts for the specified advertiser. The function also validates the new available subaccount balances to make sure that the total does not exceed the authorized amount. If the new advertiser-set available subaccount balances does not exceed the authorized amount, a function is invoked which will update all of the subaccount balances in the persistent state and display the update in read-only format.

If there are pending funds in the current account balance, the pending funds must be allocated separately from the available current balance. The pending funds will then be added into the available current balance when the funds are received. The function must therefore prompt the advertiser to choose between allocating pending funds or allocating available funds. The allocating pending funds selection works in much the same manner as the allocating available funds selection outlined above. After the advertiser chooses to allocate pending funds, a routine is invoked to display current pending balances for the account and the subaccounts. The advertiser distributes the pending subaccount balances between campaigns and submits a request to update the balances. A function is invoked which calculates and displays the current running totals for the pending subaccount balances. This function also validates the new pending subaccount allocations to make sure that the allocations do not exceed any authorized amount. The current running total of pending allocations is set to the sum of current pending balances for all subaccounts for the advertiser. If the new user-set pending subaccount balances or the total of such balances do not exceed any authorized amount, the function will update all of the pending subaccount allocations in the persistent state, e.g. the advertiser's account in the database, and display the update in read-only format.

As indicated above and shown in FIG. 2, a routine displaying the account management menu 170 may be invoked from the advertiser main menu 120. Aside from the "Allocate Money Between Subaccounts" selection described above, the remaining selections all use to some extent the search listings present in the advertiser's account on the database, and may also affect the advertiser's entry in the search result list. Thus, a further description of the search result list generated by the search engine is needed at this point.

When a remote searcher accesses the search query page on the search engine web server 24 and executes a search request according to the procedure described previously, the search engine web server 24 preferably generates and displays a search result list where the "canonicalized" entry in search term field of each search listing in the search result list exactly matches the canonicalized search term query entered by the remote searcher. The canonicalization of search terms used in queries and search listings removes common irregularities of search terms entered by searches and web site promoters, such as capital letters and pluralizations, in order to generate relevant results. However, alternate schemes for determining a match between the search term field of the search listing and the search term query entered by the remote searcher are well within the scope of the present invention. For example, string matching algorithms known in the art may be employed to generate matches where the keywords of the search listing search term and the search term query have the same root but are not exactly the same (e.g., computing vs. computer). Alternatively a thesaurus database of synonyms may be stored at search engine web server 24, so that matches may be generated for a search term having synonyms. Localization methodologies may also be employed to refine certain searches. For example, a search for "bakery" or "grocery store" may be limited to those advertisers within a selected city, zip code, or telephone area code. This information may be obtained through a cross-reference of the advertiser account database stored at storage 32 on account management server 22. Finally, internationalization methodologies may be employed to refine searches for users outside the United States. For example, country or language-specific search results may be generated, by a cross-reference of the advertiser account database, for example.

An example of a search result list display used in an embodiment of the present invention is shown in FIG. 7, which is a display of the first several entries resulting from a search for the term "zip drives". As shown in FIG. 7, a single entry, such as entry 710*a* in a search result list consists of a description 720 of the web site, preferably comprising a title and a short textual description, and a hyperlink 730 which, when clicked by a searcher, directs the searcher's browser to the URL where the described web site is located. The URL 740 may also be displayed in the search result list entry 710*a*, as shown in FIG. 7. The "click through" of a search result item occurs when the remote searcher viewing the search result item display 710 of FIG. 7 selects, or "clicks" on the hyperlink 730 of the search result item display 710. In order for a "click through" to be completed, the searcher's click should be recorded at the account management server and redirected to the advertiser's URL via the redirect mechanism discussed above.

Search result list entries 710*a*–710*h* may also show the rank value of the advertiser's search listing. The rank value is an ordinal value, preferably a number, generated and assigned to the search listing by the processing system 34 of FIG. 1. Preferably, the rank value is assigned through a process, implemented in software, that establishes an association between the bid amount, the rank, and the search term of a search listing. The process gathers all search listings that match a particular search term, sorts the search listings in order from highest to lowest bid amount, and assigns a rank value to each search listing in order. The highest bid amount receives the highest rank value, the next highest bid amount receives the next highest rank value, proceeding to the lowest bid amount, which receives the lowest rank value. Most preferably, the highest rank value is 1 with successively increasing ordinal values (e.g., 2, 3, 4, . . . ) assigned in order of successively decreasing rank. The correlation between rank value and bid amount is illustrated in FIG. 7, where each of the paid search list entries 710*a* through 710*f* display the advertiser's bid amount 750*a* through 750*f* for that entry. Preferably, if two search listings having the same search term also have the same bid amount, the bid that was received earlier in time will be assigned the higher rank value. Unpaid listings 710*g* and 710*h* do not display a bid amount and are displayed following the lowest-ranked paid listing. Preferably, unpaid listings are displayed if there are an insufficient number of listings to fill the 40 slots in a search results page. Unpaid listings are generated by a search engine utilizing objective distributed database and text searching algorithms known in the art. An example of such a search engine may be operated by Inktomi Corporation. The original search query entered by the remote searcher is used to generate unpaid listings through the conventional search engine.

Figure 8:
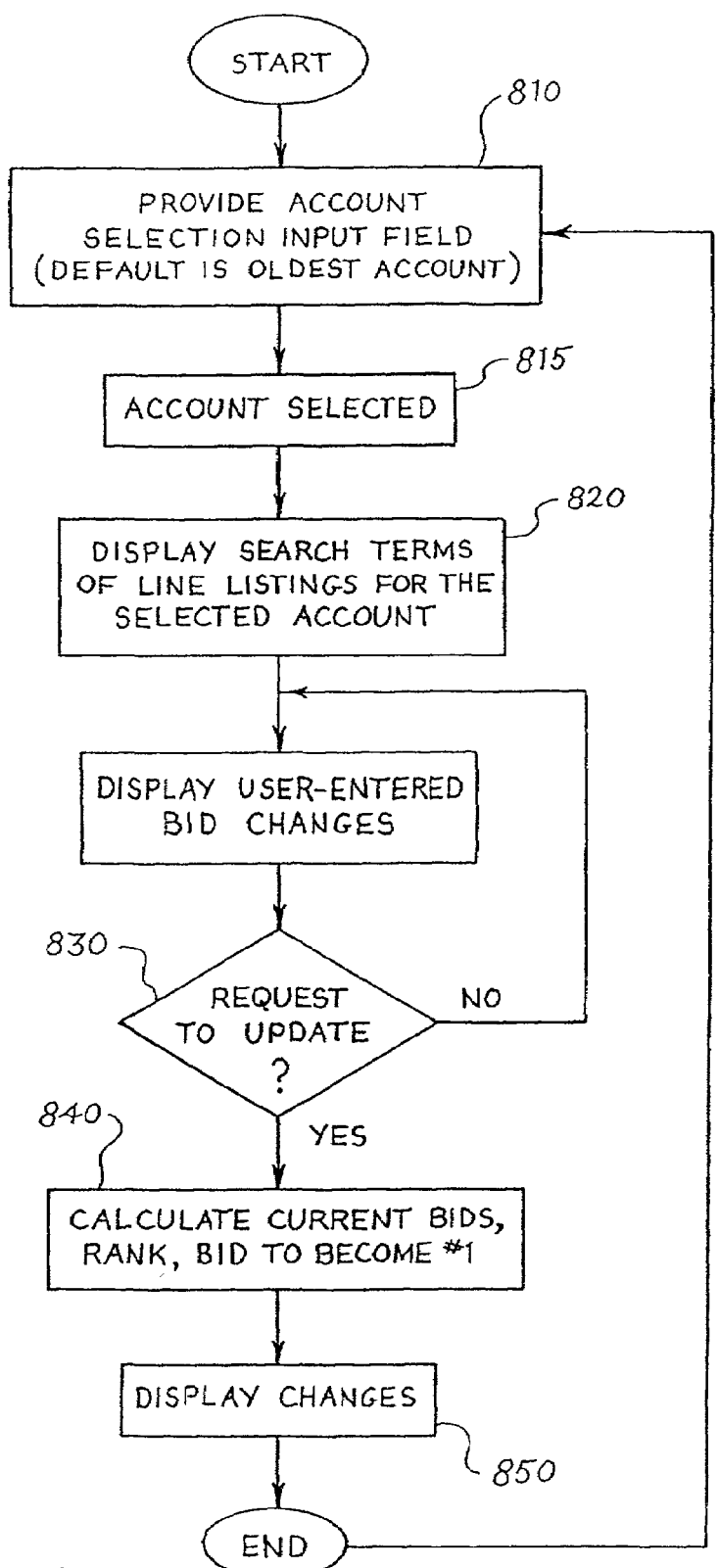
FIG. 8 is a flow chart illustrating a change bids process used in one embodiment of the present invention.

As shown in the campaign management menu 170 of FIG. 2, several choices are presented to the advertiser to manage search listings. First, in the "Change Bids" selection, the advertiser may change the bid of search listings currently in the account. The process invoked by the system for the change bids function is shown in FIG. 8. After the advertiser indicates the intent to change bids by selecting the "Change Bids" menu option, the system searches the user's account in the database and displays the search listings for the entire account or a default subaccount in the advertiser's account, as shown in step 810. Search listings may be grouped into subaccounts defined by the advertiser and may comprise one or more search listings. Only one subaccount may be displayed at a time. The display should also preferably permit the advertiser to change the subaccount selected, as shown in step 815. The screen display will then show the search listings for the selected subaccount, as indicated in step 820.

Figure 9:
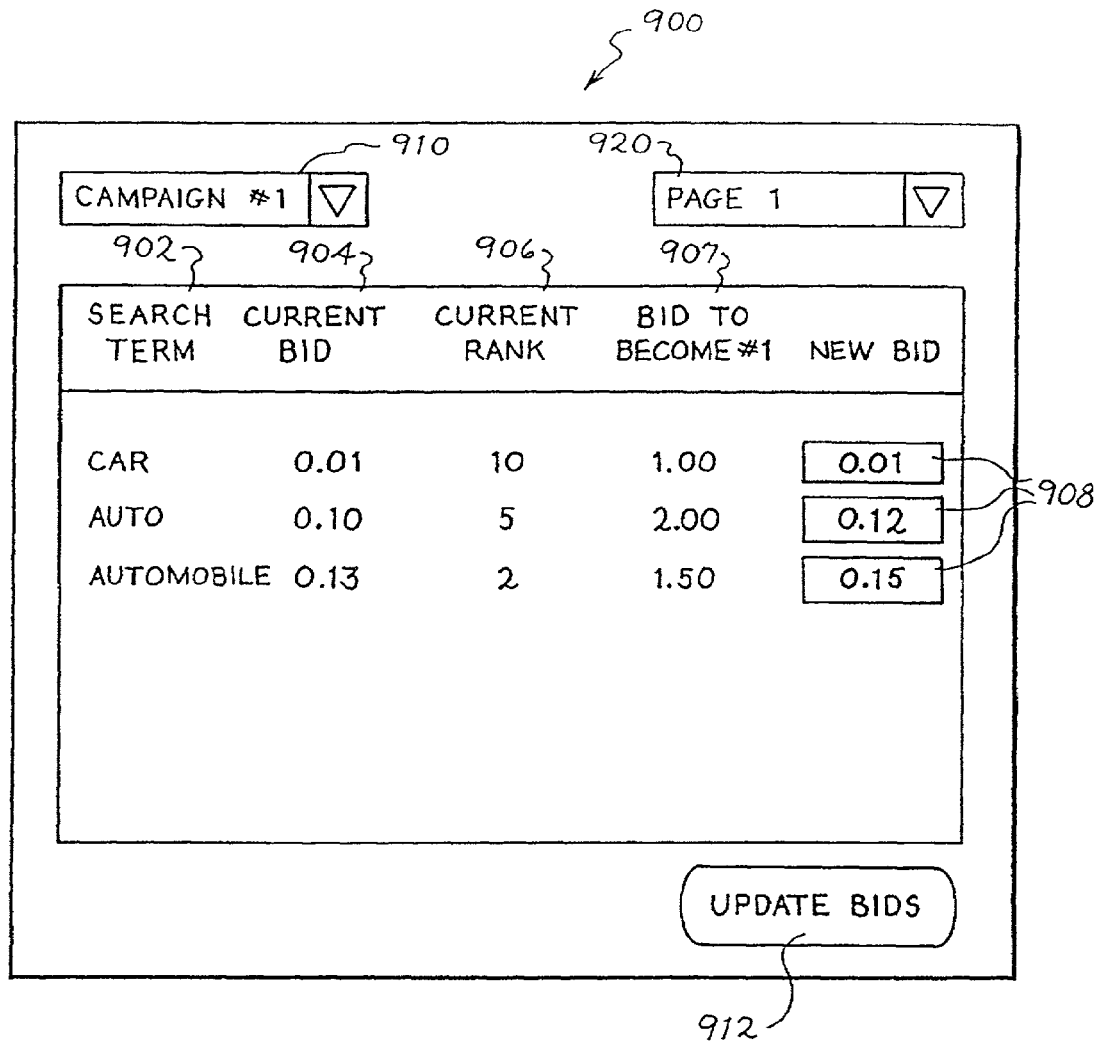
FIG. 9 illustrates an example of a screen display used in the change bids process of FIG. 8.

An example of screen display shown to the advertiser in step 810 is shown in FIG. 9 and will be discussed below. To change bids, the advertiser user may specify new bids for search terms for which the advertiser already has an existing bid by entering a new bid amount into the new bid input field for the search term. The advertiser-entered bid changes are displayed to the advertiser at step 820 of FIG. 8 as discussed above. To update the bids for the display page, the advertiser requests, at step 830 of FIG. 8, to update the result of changes. The advertiser may transmit such a request to the account management server by a variety of means, including clicking on a button graphic.

As shown in step 840 of FIG. 8, upon receiving the request to update the advertiser's bids, the system calculates the new current bid amounts for every search listing displayed, the rank values, and the bid amount needed to become the highest ranked search listing matching the search term field. Preferably, the system then presents a display of changes at step 850. After the user confirms the changes, the system updates the persistent state by writing the changes to the account in the database.

The search listing data is displayed in tabular format, with each search listing corresponding to one row of the table 900. The search term 902 is displayed in the leftmost column, followed by the current bid amount 904, and the current rank 906 of the search listing. The current rank is followed by a column entitled "Bid to become #1" 907, defined as the bid amount needed to become the highest ranked search listing for the displayed search term. The rightmost column of each row comprises a new bid input field 908 which is set initially to the current bid amount.

As shown in FIG. 9, the search listings may be displayed as "subaccounts." Each subaccount comprises one search listing group, with multiple subaccounts residing within one advertiser account. Each subaccount may be displayed on a separate display page having a separate page. The advertiser should preferably be able to change the subaccount being displayed by manipulating a pull-down menu 910 on the display shown in FIG. 9. In addition, search listing groups that cannot be displayed completely in one page may be separated into pages which may be individually viewed by manipulating pull-down menu 920. Again, the advertiser should preferably be able to change the page displayed by clicking directly on a pull-down menu 920 located on the display page of FIG. 9. The advertiser may specify a new bid for a displayed search listing by entering a new bid amount into the new bid input field 908 for the search listing. To update the result of the advertiser-entered changes, the advertiser clicks on button graphic 912 to transmit an update request to the account management server, which updates the bids as described above.

Many of the other selections listed in the "Account Management" menu 170 of FIG. 2 function as variants of the "Change Bid" function described above. For example, if the advertiser selects the "Change Rank Position" option, the advertiser may be presented with a display similar to the display of FIG. 9 used in the "Change Bid" function. However, in the "Change Rank Position" option, the "New Bid" field would be replaced by a "New Rank" field, in which the advertiser enters the new desired rank position for a search term. After the advertiser requests that the ranks be updated, the system then calculates a new bid price by any of a variety of algorithms easily available to one skilled in the art. For example, the system may invoke a routine to locate the search listing in the search database having the desired rank/search term combination, retrieve the associated bid amount of said combination, and then calculate a bid amount that is N cents higher; where N=1, for example. After the system calculates the new bid price and presents a read-only confirmation display to the advertiser, the system updates the bid prices and rank values upon receiving approval from the advertiser.

The "Modify Listing Component" selection on Account Management menu 170 of FIG. 2 may also generate a display similar to the format of FIG. 9. When the advertiser selects the "Modify Listing Component" option, the advertiser may input changes to the URL, title, or description of a search listing via web-based forms set up for each search listing. Similar to the process discussed above, the forms for the URL, title, and description fields may initially contain the old URL, title and description as default values. After the advertiser enters the desired changes, the advertiser may transmit a request to the system to update the changes. The system then displays a read-only confirmation screen, and then writes the changes to the persistent state (e.g., the user account database) after the advertiser approves the changes.

A process similar to those discussed above may be implemented for changing any other peripheral options related to a search listing; for example, changing the matching options related to a bidded search term. Any recalculations of bids or ranks required by the changes may also be determined in a manner similar to the processes discussed above.

In the "Delete Bidded Search Term" option, the system retrieves all of the search listings in the account of the advertiser and displays the search listings in an organization and a format similar to the display of FIG. 9. Each search listing entry may include, instead of the new bid field, a check box for the advertiser to click on. The advertiser would then click to place a check (X) mark next to each search term to be deleted, although any other means known in the art for selecting one or more items from a list on a web page may be used. After the advertiser selects all the search listings to be deleted and requests that the system update the changes, the system preferably presents a read-only confirmation of the requested changes, and updates the advertiser's account only after the advertiser approves the changes. The "deleted" search listings are removed from the search database 36 and will not appear in subsequent searches. However, the search listing will remain as part of the advertiser's account record for billing and account activity monitoring purposes.

In the "Add Bidded Search Term" option, the system provides the advertiser with a display having a number of entry fields corresponding to the elements of a search listing. The advertiser then enters into each field information corresponding to the respective search listing element, including the search term, the web site URL, the web site title, the web site description, and the bid amount, as well as any other relevant information. After the advertiser has completed entering the data and has indicated thus to the system, the system returns a read-only confirmation screen to the advertiser. The system then creates a new search listing instance and writes it into the account database and the search database upon receiving approval from the advertiser.

Preferably, the "Account Management" menu 170 of FIG. 2 provides a selection for the advertiser to "Get Suggestions On Bidded Search Term". In this case, the advertiser enters a bidded search term into a form-driven query box displayed to the advertiser. The system reads the search term entered by the advertiser and generates a list of additional related search terms to assist the advertiser in locating search terms relevant to the content of the advertiser's web site. Preferably, the additional search terms are generated using methods such as a string matching algorithm applied to a database of bidded search terms and/or a thesaurus database implemented in software. The advertiser may select search terms to bid on from the list generated by the system. In that case, the system displays to the advertisers the entry fields described above for the "Add Bidded Search Term" selection, with a form for entering a search listing for each search term selected. Preferably, the selected search term is inserted as a default value into the form for each search listing. Default values for the other search listing components may also be inserted into the forms if desired. Thus, in one embodiment, the disclosed system receives a list of search terms associated with an advertiser on the database search system, determines candidate search terms based on search terms of other advertisers on the database search system, and recommends the additional search terms from among the candidate search terms. In another embodiment, the disclosed system provides receiving a search term of an advertiser in response to the received search term, generating a list of additional related search terms, and receiving advertiser selected search terms from the list of additional related search terms.

The "Account Management" menu 170 of FIG. 2 also preferably provides advertisers with a "Project Expenses" selection. In this selection, the advertiser specifies a search listing or subaccount for which the advertiser would like to predict a "daily run rate" and "days remaining to expiration." The system calculates the projections based on a cost projection algorithm, and displays the predictions to the advertiser on a read-only screen. The predictions may be calculated using a number of different algorithms known in the art. However, since the cost of a search listing is calculated by multiplying the bid amount by the total number of clicks received by the search listing at that bid amount during a specified time period, every cost projection algorithm must generally determine an estimated number of clicks per month (or other specified time period) for a search listing. The clicks on a search listing may be tracked via implementation of a software counting mechanism as is well known in the art. Clicks for all search listings may be tracked over time, this data may be used to generate estimated numbers of clicks per month overall, and for individual search terms. For a particular search term, an estimated number of searches per day is determined and is multiplied by the cost of a click. This product is then multiplied by a ratio of the average number of clicks over the average number of impressions for the rank of the search listing in question to obtain a daily run rate. The current balance may be divided by the daily run rate to obtain a projected number of days to exhaustion or "expiration" of account funds.

One embodiment of the present invention bases the cost projection algorithm on a simple predictor model that assumes that every search term performs in a similar fashion. This model assumes that the rank of the advertiser's search listing will remain constant and not fluctuate throughout the month. This algorithm has the advantages of being simple to implement and fast to calculate. The predictor model is based on the fact that the click through rate, e.g. the total number of clicks, or referrals, for a particular searcher listing, is considered to be a function of the rank of the search listing. The model therefore assumes that the usage curve of each search term, that is, the curve that result when the number of clicks on a search listing is plotted against the rank of the search listing, is similar to the usage curve for all search terms. Thus, known values extrapolated over time for the sum of all clicks for all search terms, the sum of all clicks at a given rank for all search terms, and the sum of all clicks for the selected search term may be employed in a simple proportion to determine the total of all clicks for the given rank for the selected search term. The estimated daily total of all clicks for the selected search term at the selected rank is then multiplied by the advertiser's current bid amount for the search term at that rank to determine a daily expense projection. In addition, if particular search terms or classes of search terms are known to differ markedly from the general pattern, correction values specific to the search term, advertiser, or other parameter may be introduced to fine-tune the projected cost estimate.

Finally, the "Account Management" menu 170 of FIG. 2 provides several selections to view information related to the advertiser's campaigns. The "View Subaccount Information" selection displays read-only information related to the selected subaccount. The "View Search Term List" selection displays the list of the advertiser's selected search terms along with the corresponding URLs, bid price, and rank, with the search terms preferably grouped by subaccount. The advertiser may also view current top bids for a set of search terms selected from a list of search terms from a read-only display generated by the system upon receiving the requested search terms from the advertiser.

For an advertiser who requires a more comprehensive report of search listing activity, the "View Report" option may be selected from the Advertiser Main Page 120 of FIG. 2. In an embodiment of the present invention, the "View Report" options generate reports comprehensive for up to one year preceding the current date. For example, daily reports are available for the each of the immediately preceding 7 days, weekly reports for the preceding four weeks, monthly reports for the preceding twelve months, and quarterly reports for the last four quarters. Additional reports may also be made available depending on advertiser interest. Other predefined report types may include activity tracked during the following time periods: Since Inception of the Account, Year To Date, Yearly, Quarter To Date, Month To Date, and Week to Date. Report Categories may include a Detail Report, viewable by Advertiser Account, by Search Listing, and by URL, and a Summary Report, viewable by Advertiser Account and by Subaccount. The reports may include identification data such as advertiser account and subaccount name, the dates covered by the report and the type of report. In addition, the reports may include key search listing account data such as current balance, pending current balance, average daily account debit, and run rate. Furthermore, the reports may also include key data, such as: search terms, URLs, bids, current ranks, and number of clicks, number of searches done for the search term, number of impressions (times that the search listing appeared in a search result list), and click through rate (defined as Number of Clicks/Number of Impressions). Preferably, the report is available in at least HTML view options for viewing via a browser program, printing, or downloading. Note, however, that other view options may be made available, such as Adobe Acrobat, PostScript, ASCII text, spreadsheet interchange formats (e.g., CSV, tab-delimited), and other well-known formats.

When the advertiser has selected the "View Report" option, the system invokes a function which displays a list of available report types, dates, categories, and view options. The system preferably creates a report instance with the following fields, all of which are initially set to null: report type, report date, report category, and view option. Once the advertiser has defined the parameters described above, the system invokes a function to generate the requested report, based on the advertiser-set parameters, and to display the report, based on the view option parameter.

Finally, a preferred embodiment of the present invention implements an option for context specific help that the advertiser may request at any time the advertiser is logged in. The help option may be implemented as a small icon or button located on the system generated display page. The advertiser may click on the icon or button graphic on the display page to request help, upon which the system generates and displays a help page keyed to the function of the particular display the user is viewing. The help may be implemented as separate display pages, a searchable index, dialog boxes, or by any other methods well known in the art.

FIGS. 10–20 illustrate particular embodiments of a method and apparatus for making search term recommendations to a web site promoter or advertiser in a pay for placement market system such as that described above in conjunction with FIGS. 1–9. Disclosed embodiments provide a method for a database search system. The method includes maintaining a database of search listings including associated search terms, receiving a list of search terms associated with an advertiser, recommending additional search terms to the advertiser. Other disclosed embodiments provide a data base operating method for a database search system which stores advertiser search listings including advertiser selected search terms. The method includes spidering a specified web site to obtain an initial list of advertiser search terms for an advertiser. The method further includes filtering the initial list of advertiser search terms using search terms of other advertisers and storing in a search listing database search listings for the advertiser, the search listings formed with the filtered search terms.

Disclosed embodiments also include a database search system which includes a database of search terms in which each search term is associated with one or more advertisers. Program code is configured to recommend additional search terms for an advertiser based on search terms in the database. Still further, embodiments disclosed herein provide a method for a database search system which includes receiving a search term of an advertiser and, in response, generating a list of additional related search terms. The method then includes receiving advertiser selected search terms from the list of additional related search terms.

In the embodiments shown here, spidering and collaborative filtering are used to identify possible search terms to recommend to an advertiser. The following introduction first describes the individual techniques of spidering and collaborative filtering, and then shows how the two may be combined.

Spidering is a simple technology for downloading a web site rooted at a uniform resource locator (URL). A program downloads the home page given by the URL, then scans it for hyperlinks to other pages and downloads them. The spidering process continues until the program reaches a predefined link depth, downloads a predetermined number of pages, or reaches some other stopping criterion. The order in which pages are downloaded can be either breadth-first or depth-first. In breadth-first spidering, the program adds new URL's to the end of its list of pages to download; in depth-first spidering, it adds them to the beginning. These algorithms are straightforward and well known to engineers skilled in the state of the art. Further information about these techniques may be found by consulting Cho, Molina, and Page, "Efficient Crawling through URL Ordering", available from ResearchIndex on the Internet at citeseer.nj.nec.com or Nilsson, *Principles of Artificial Intelligence*, ISBN 0934613109.

Some embodiments described herein use spidering to find search terms that appear directly on an advertiser's web site. Starting at the root of the advertiser's site, the method and system in accordance with the present embodiments downloads pages breadth first and scans them for search terms. It records every term it finds that the provider's database indicates has been searched in the past month. As an example, if the text on a page includes the phrase "tropical fish store," then the program will find the six terms "tropical," "fish," "store," "tropical fish," "fish store," and "tropical fish store." The program scores these terms using a quality metric, adding the ones that are above a particular threshold to its list of recommendations. In the preferred embodiment the quality metric considers two factors: how common a search term is on the World Wide Web, and how often users search for it. When the program has accumulated enough recommendations, it sorts them by either their quality or by the number of times they have occurred in the downloaded pages and returns the list.

The spidering component of the current embodiments differs from previous tools in three important ways. First, it looks directly at the pages in an advertiser's web site, as opposed to downloading other pages that are not in the advertiser's web site, and that might be completely unrelated. Second, it looks at all of the text on a web page, as opposed to just the words in the DESCRIPTION and KEYWORD tags. Third, it uses its quality metric to eliminate poor search terms without ever showing them to the advertiser.

Collaborative filtering is a technology for making recommendations based on user similarity. As an example, a company like Amazon.com uses collaborative filtering to make book recommendations. Once a customer has bought several books using the on line service available at www.amazon.com, Amazon.com recommends new books by comparing the customer to others in its database. When it finds another customer that has made many of the same purchases, it recommends the choices of each to the customer. The current embodiments extend this idea to recommending search terms for advertisers on a pay-for-placement search engine.

For example, suppose a typical provider has a database of 50,000 advertisers. A portion of that database might look like this:

|  | Fish | Tuna | Halibut | Bait | Worms | Cars |
|---|---|---|---|---|---|---|
| Joe's Fish | X | X | X | — | — | — |
| Rick's Car Shop | — | — | — | — | — | X |
| Bill's Tackle | X | — | — | X | X | — |

An X in the table indicates that an advertiser has bid on a term. In the seafood example, an advertiser that is initially interested in "fish" is similar to both Joe and Bill, and the program will recommend "tuna," "halibut," "bait," and "worms." If the advertiser refines his search terms to include "tuna" but exclude "bait," then he is no longer similar to Bill, and the program will stop recommending "worms." Like STF, the current invention allows the advertiser to iteratively accept and reject words until he is satisfied with the list of recommendations.

Quantitatively, collaborative filtering computes the Pearson correlation between the new advertiser and all of the existing advertisers. To calculate this correlation, a numeric rating is assigned to each entry in the advertiser/term table. In one possible assignment, the highest rating is 5, indicating that a term is a perfect description of an advertiser's site, and the lowest rating is 0, indicating that a term is irrelevant. In the preferred embodiment, an advertiser gets a rating of 5 for every term he has bid on and a rating of UNKNOWN for every other term. The new advertiser gets a rating of 5 for terms the advertiser has accepted, a 1 for terms he has rejected, and a 2 for every other term. The Pearson correlation between the new advertiser and an existing advertiser is then $$\rho_a = \frac{\sum_t (r_{n,t} - \bar{r}_n)(r_{a,t} - \bar{r}_a)}{\sigma_n \sigma_a}$$

In this formula, n is the new advertiser, $\rho_a$ is his correlation to advertiser a, $r_{n,t}$ is the rating he assigns to term t, and $\bar{r}_n$ and $\sigma_n$ are the mean and standard deviation of his ratings. The terms with the a subscripts have the corresponding meanings for the existing advertiser. The sum is taken over all search terms. A rating of UNKNOWN is replaced by the mean of an advertiser's ratings, so any term with an UNKNOWN cancels out of the equation. Correlations range between −1 and 1, with zero being no correlation and a positive correlation indicating that two advertisers have similar ratings. This formula is well known from statistics and familiar to engineers skilled in the state of the art. Further details may be found by consulting Wadsworth [ed], *The Handbook of Statistical Methods for Engineers and Scientists*, ISBN 007067678X.

Once the collaborative filter has computed the correlation between the new advertiser and the existing advertisers, it predicts how likely it is that each term is a good search term for the new advertiser. It does this by computing the average rating of each term, where an advertiser's contribution to the average is determined by its correlation to the new advertiser. An advertiser that has a high correlation receives full weight; an advertiser that has a low correlation receives little weight; an advertiser that has zero correlation receives no weight. One formula for this prediction is $$e_t = \bar{r}_n + \frac{\sum_a (r_{a,t} - \bar{r}_a)\rho_a}{\sum_a \rho_a}$$

In this formula, n is the new advertiser and $e_t$ is his estimated rating for term t. The remaining terms have the same meaning as in the previous formula. The sum is taken over all existing advertisers. An UNKNOWN rating is again replaced by the mean of an advertiser's known ratings, so it cancels out of the equation. The formula is a weighted sum that estimates ratings on the same 0 to 5 scale as the original ratings. A term receives a high estimate if all the highly correlated advertisers rate it highly. The output of the collaborative filter is the list of search terms sorted by their estimated ratings.

These formulas provide a straightforward technique for calculating ratings based on similarity. There are many similar formulas and variations. For example, when making predictions it is usually better not to take a weighted average over all advertisers, but just over the 10–20 most highly correlated ones. There are also techniques for improving the efficiency of the calculations, or for doing collaborative filtering without using correlations or distance metrics. These variations are readily found in the literature on collaborative filtering, and the current embodiments are not constrained to any one of them. More details on the advantages and disadvantages of different collaborative filtering algorithms can be found at the GroupLens web site at www.cs.umn.edu/Research/GroupLens.

Given the core building blocks of spidering and collaborative filtering, the complete system and method according to one present embodiment works as follows: starting with an initial list of accepted and rejected search terms, run the collaborative filtering algorithm, allow the advertiser to accept and reject new terms, and then rerun the collaborative filtering. End this process when the advertiser is satisfied with his list of accepted terms. The technique gets its initial list of accepted terms in one of three ways: either directly from the advertiser, or from an existing advertiser's bid list, or from the list of recommendations returned by running the web spider on the new advertiser's web site. This last method is the preferred embodiment. When using the web spider, the search terms that it recommends receive initial ratings that vary on a linear scale from 4.9 down to 2.1. Whenever the invention displays recommendations to the advertiser, it interleaves the original spider recommendations with the output of the collaborative filtering, since the recommendations from the two techniques are often complementary. The interleaving formula weights the recommendations of the web spider less and less as the advertiser accepts and rejects more terms.

In typical use, a new advertiser will start with the URL of his web site and go through 3–5 iterations of accepting and rejecting terms. As long as his web site is similar to those of existing advertisers, the system will quickly identify them and make high quality recommendations. The recommendations will be good even if no single advertiser is a perfect match, since the weighted sum allows the system to combine recommendations from many advertisers. And when there is no advertiser that is similar to the new advertiser, the web spider still makes good recommendations by finding search terms directly on the advertiser's web site. In contrast to the existing state of the art, the current embodiments provide excellent coverage of good search terms while eliminating bad ones.

Figure 10:
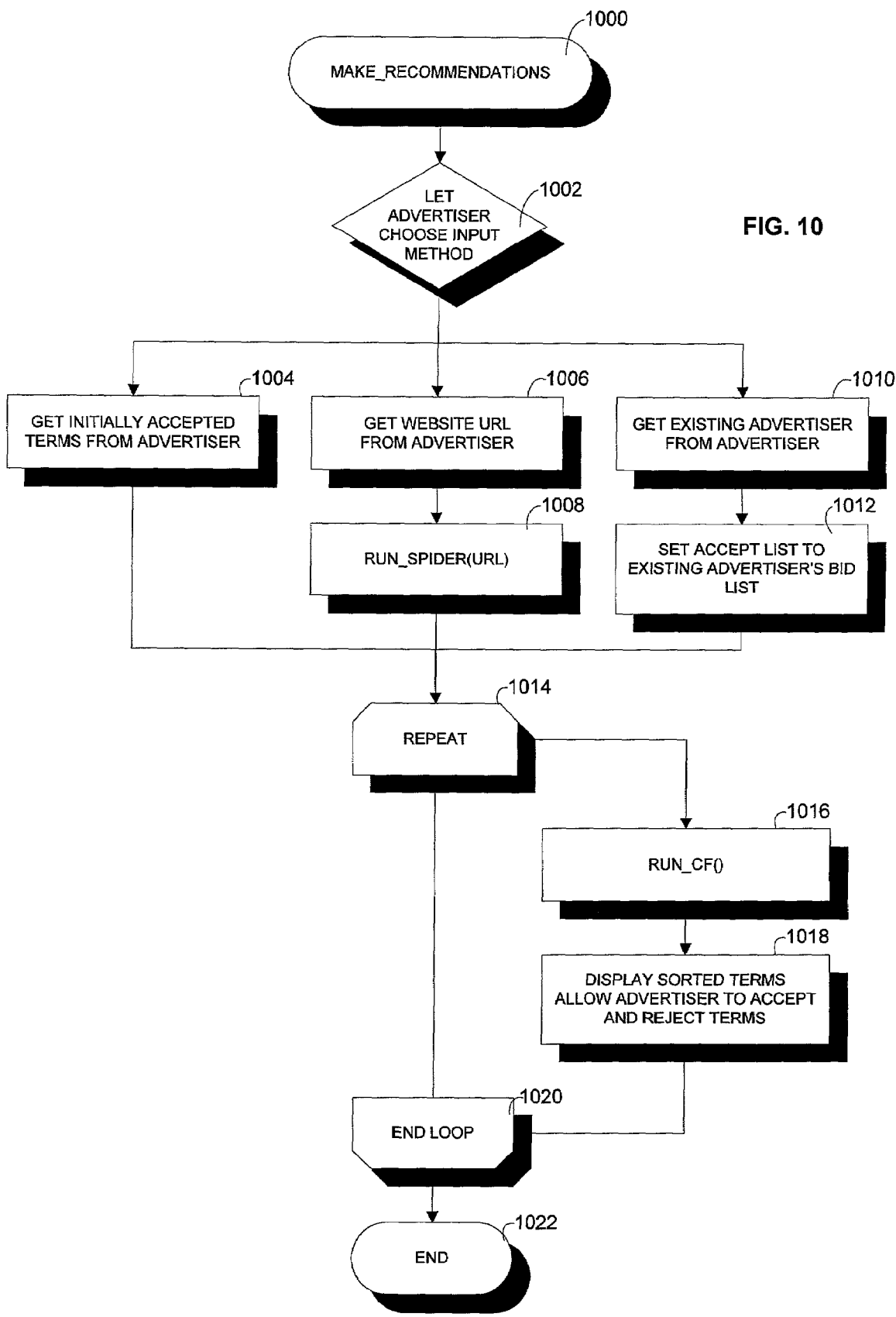
FIG. 10 is a flow diagram illustrating a method for recommending search terms to an advertiser on a pay-for-placement search engine.

Referring now to the drawing, FIG. 10 is a flow diagram illustrating a method for recommending search terms to an advertiser on a pay-for-placement search engine. The method may be implemented on a server or other data processing device associated with the pay-for placement search engine. The method may be embodied as software code operable on the data processing device in conjunction with stored data of a database or other storage element. An advertiser accesses the server to run the program using any suitable device such as a remotely-located personal computer linked to the server over the internet. One exemplary embodiment of a suitable system is shown above in conjunction with FIG. 1. The method begins at block 1000.

In block 1002, the system prompts the advertiser to choose an input method to create the initial list of accepted search terms. This list may come from direct advertiser input, from a uniform resource locator (URL) specified by the advertiser, or from a preexisting advertiser specified by the advertiser. After prompting the advertiser for the method he wants to use, the program follows one of the three paths shown in FIG. 10.

If the advertiser chooses to specify the initial list of search terms directly, at block 1004 the terms are received from the advertiser. In one exemplary embodiment, the program displays a text box in which the advertiser can enter a comma-separated list of initial terms. If the advertiser chooses to specify a URL as the source of the initial list of search terms, the advertiser is then prompted to enter a web site URL. The system runs a spider algorithm to extract search terms from that site, block 1008. An exemplary embodiment of such a spider algorithm will be described below in conjunction with FIGS. 11–13. If the advertiser chooses to specify a preexisting advertiser as the source of the initial list of search terms, at block 1010 identification information for the preexisting advertiser is received from the advertiser. The new advertiser picks an existing advertiser and the program sets the list of initially accepted terms to be the list of terms that advertiser has bid on, block 1012.

The method now enters its main loop, including blocks 1014, 1016, 1018, 1020. During each iteration, it runs the collaborative filtering algorithm, block 1016, displays a sorted list of recommended search terms, and allows the advertiser to accept and reject terms, block 1018. In the exemplary embodiment, a web page including the recommended search terms is sent to the advertiser, providing a user interface for advertiser interaction with the system. The advertiser accepts and rejects terms by clicking on suitable check boxes next to the terms. When he is done making his changes, he clicks a button to transmit the page of data to the server and rerun the collaborative filtering algorithm. The advertiser can continue through as many iterations as he likes, repeating the loop, block 1014, until he is satisfied with the terms he has accepted. He then clicks a final button to exit the loop, block 1020, and store or print out his selected search terms. Preferably, communication with the advertiser is over the internet using a suitable data transfer protocol such as TCP/IP. Other data communication channels may be substituted. The method ends at block 1022.

Figure 11:
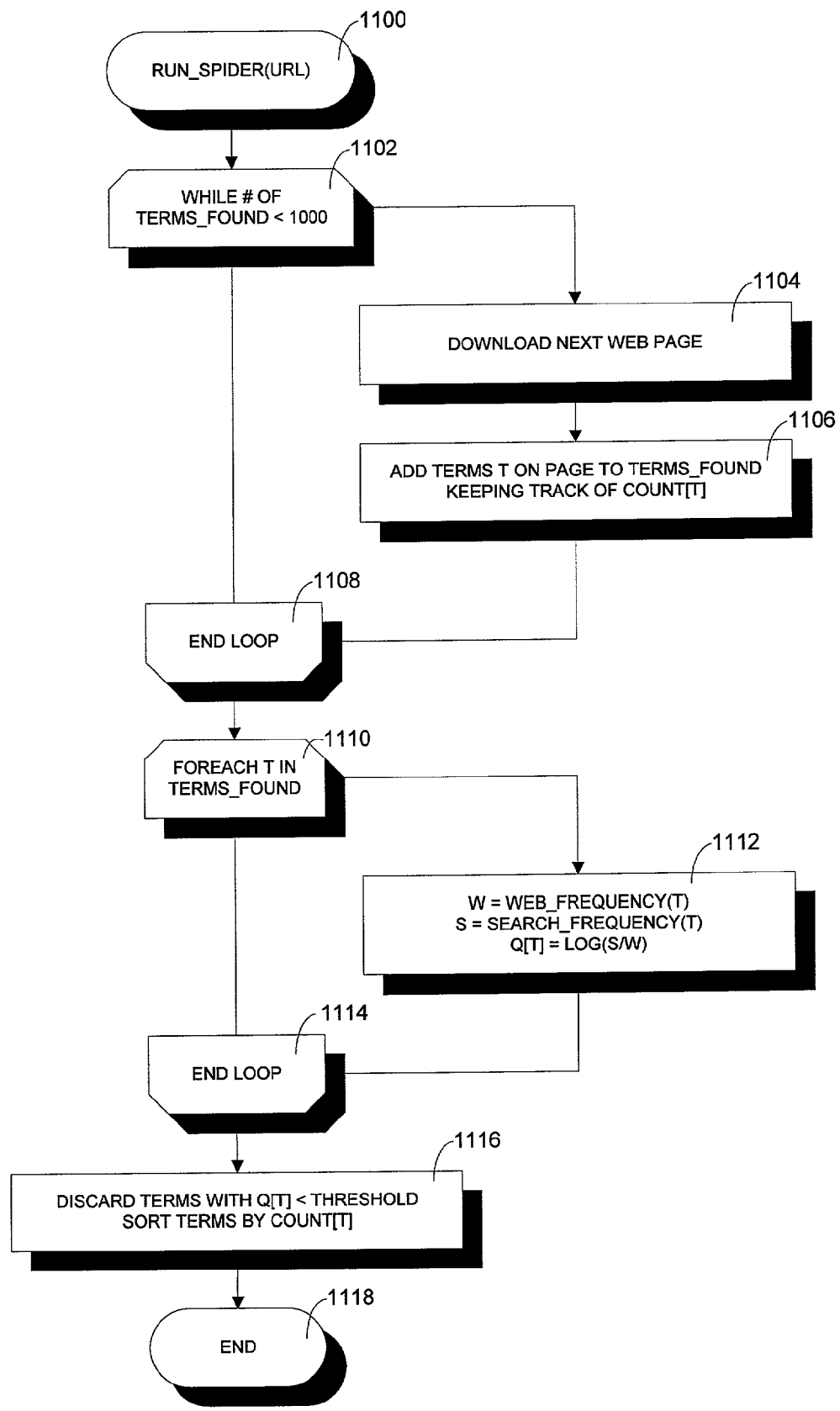
FIG. 11 is a flow diagram illustrating a method for rating search terms by spidering a web site.

FIG. 11 is a flow diagram showing a method for performing a spidering algorithm. This algorithm may be called, for example, at block 1008 of FIG. 10. The method begins at block 1100. The procedure is called passing a URL that is the root of an advertiser's web site. Starting with this URL, the procedure enters a loop including blocks 1102, 1104, 1106, 1108. The procedure downloads pages using a breadth-first spidering algorithm. For each page that it downloads, block 1104, it scans the text on the page to find every phrase that has been used as a search term in the past month. In the preferred embodiment, this scanning is done by constructing a finite state machine that recognizes the regular expression $s_1|s_2| \ldots |s_n$, where each $s_i$ is a valid search term. The program scans a page one character at a time using this state machine, and emits each search term as it finds it. Because the state machine only depends on the current set of valid search terms, the preferred embodiment only constructs it at regular intervals when the database of terms that users have searched changes. Algorithms for constructing such a finite state machine are readily available in the literature and appear in common search utilities such as grep, as described in Aho and Hopcraft, *The Design of Computer Algorithms*, ISBN 0201000296. They are well known to practitioners of ordinary skill in the art of computer system design.

Each time the spider finds a new term on a page, it adds it to the list of terms it has found on the web site, block 1106. It keeps track of how many times it has seen each term in an array COUNT[T]. The loop repeats at block 1108. The downloading and scanning process ends when the spider has found 1000 terms as indicated by the looping control of block 1102. Other thresholds or looping control techniques may be used. The looping operation of FIG. 11 is exemplary only.

The next step is to filter out bad terms. This is performed in a loop including block 1110, 1112, 1114. Bad is a subjective measure, and there are many possible metrics that an implementation might use. In the preferred embodiment the quality metric depends on two quantities: the frequency with which a term appears in documents on the World Wide Web, and the frequency with which users search for it. The quality metric is evaluated at block 1112. The method finds a term's frequency on the World Wide Web by querying a search engine that returns the number of documents containing the term. It finds the frequency with which users search for it by looking up that information in the provider's database. The quality measure employed in the illustrated embodiment is the log of the ratio of these two numbers, as shown in block 1112 of FIG. 11. To achieve a high quality rating, a term must be a popular one for people to search on, but not so common in web documents that it is useless as a search term. Because quality measures only change slowly, the preferred embodiment only calculates them at periodic intervals and caches the results. Other quality measures may be substituted.

Once the method has calculated the quality of the 1000 terms it has found, the loop is exited at block 1114 and the method discards or throws out all the terms that fall below a predetermined quality threshold, block 1116. This threshold may be variable, changing over time, because it depends on how many pages are indexed on the World Wide Web and how many users are conducting searches using the provider's search engine. In the preferred embodiment, the program automatically calibrates the threshold by looking up the quality of known terms that are on the borderline of being good search terms. It sets the threshold to the average quality of these terms. The exact list of terms depends on the search engine provider and is not constrained by the particular embodiment.

The final step in the spidering algorithm is to sort the terms that are above the quality threshold by how often they occur in the pages the spider has downloaded and scanned, at block 1116. These counts are stored in the COUNT[T] array. The sorted list is the output of the spider algorithm. In a typical embodiment the quality filter discards about 80% of the terms, and the algorithm returns about 200 terms. The spidering method ends at block 1118.

Figure 12:
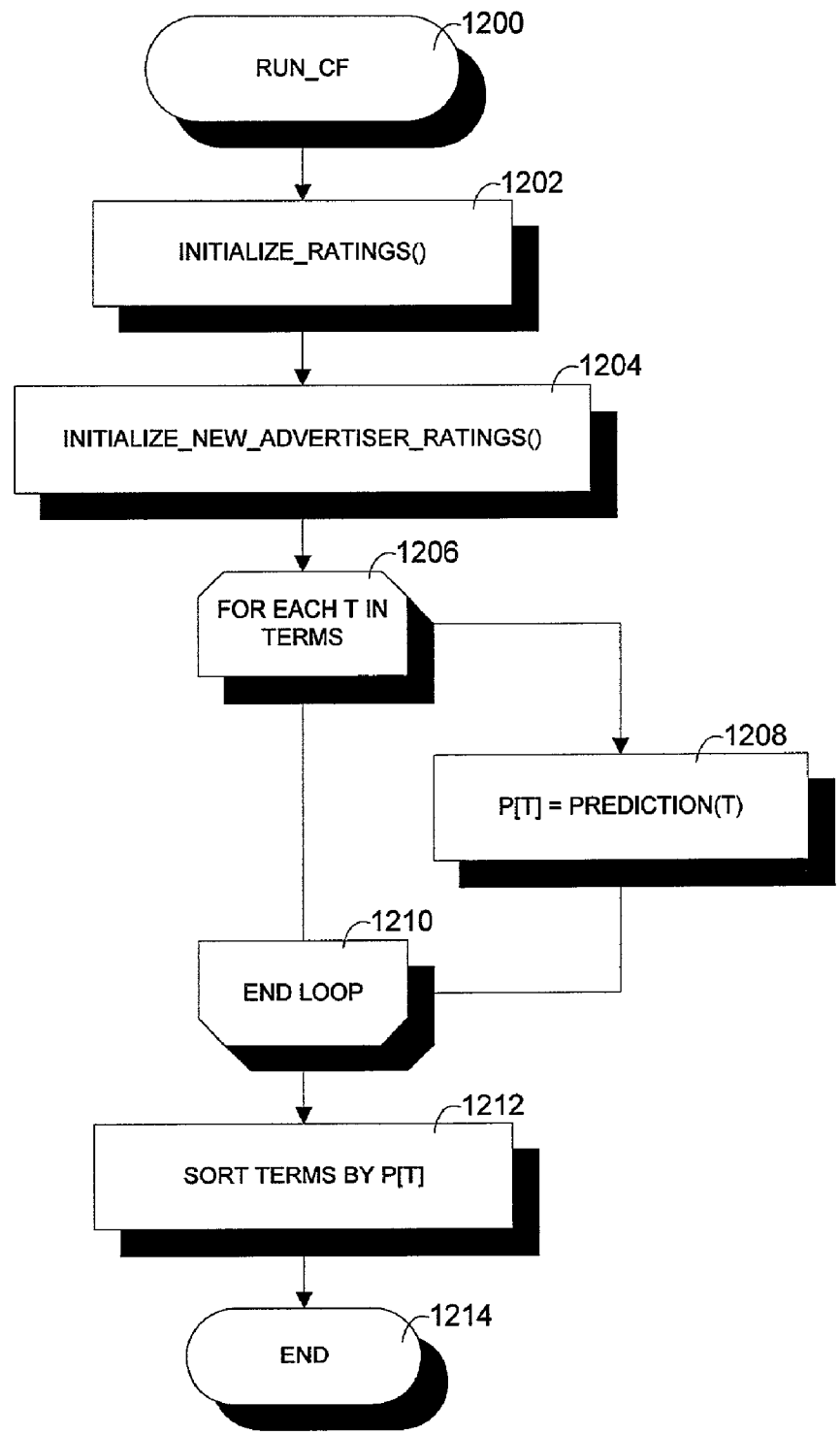
FIGS. 12–15 are flow diagrams illustrating a method for rating search terms by collaborative filtering.

FIG. 12 is a flow diagram showing one method for performing the collaborative filtering algorithm. The method begins at block 1200. At block 1202 and block 1204, rating values for the new advertiser and existing advertisers are initialized. Embodiments for performing these operations are described below in conjunction with FIGS. 13 and 14. At block 1206, control enters a loop including blocks 1206, 1208 and 1210. In this loop, the method processes the search terms selected by the collaborative filtering algorithm of FIG. 11 and calculates the new advertiser's estimated rating for each term, block 1208. One embodiment for this rating prediction method is described below in conjunction with FIGS. 18–20. After processing all search terms, the loop is exited at block 1210. At the end of the algorithm terms are sorted by their predicted ratings, block 1212. The method returns the final list as its ranked list of recommendations and then ends at block 1214.

In this algorithm and in following algorithms, there are many efficiency optimizations that an implementation might include. For example, it might return only the top 100 search terms, rather than the entire list, or it might cache computational results to avoid repeating work. All of these optimizations will be readily apparent to practitioners ordinarily skilled in the art of computing system design, and the embodiments shown here do not depend on particular optimizations an implementation uses.

Figure 13:
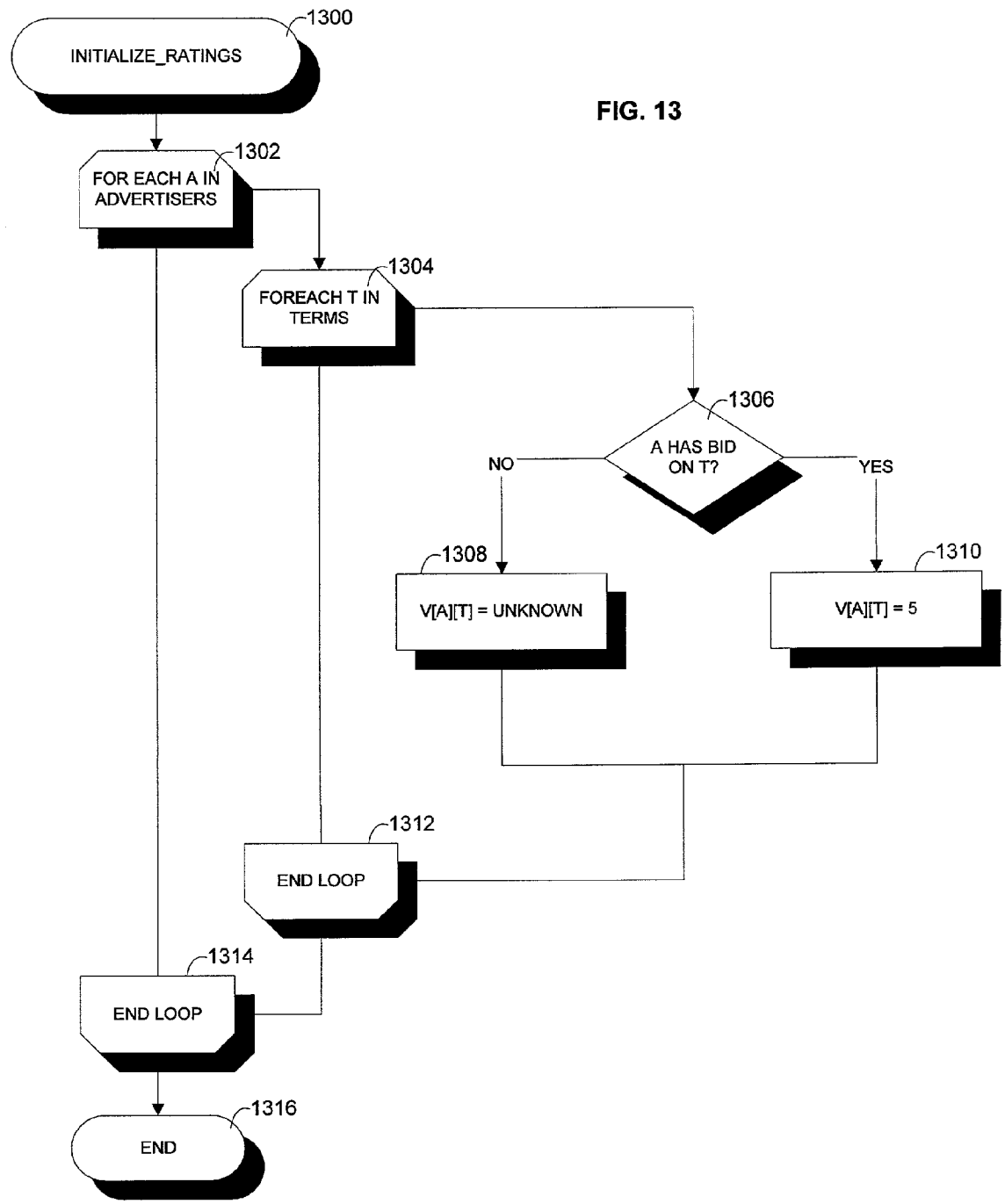

FIG. 13 is a flow diagram illustrating a preferred algorithm for initializing the rating values of existing advertisers. The algorithm is a loop over every advertiser/search term pair. For each pair, the program sets the rating to 5 if the advertiser has bid on the term, and to UNKNOWN otherwise. Ratings are stored in the V[A][T] array so that other parts of the program can access them.

The method begins at block 1300. An advertiser-processing loop is entered at block 1302 using an advertiser variable A. A term-processing loop is entered at block 1304 using a term variable T. At block 1306, the method determines if the advertiser associated with the advertiser variable A has bid on the term associated with the variable T. If not, at block 1308, the rating V[A][T] is set to a value of UNKNOWN in an array of rating values. If the advertiser has bid on the term, at block 1310 the array entry V[A][T] is set to 5, which is an arbitrarily chosen value.

At block 1312, the term variable is incremented or otherwise changed to select a next term. Control remains in the loop including blocks 1304, 1306, 1308, 1310, 1312 until all search terms have been processed for the variable associated with variable A. Then at block 1314, the advertiser variable A is incremented or otherwise changed and looping proceeds through search terms for the newly selected advertiser. After all advertisers have been processed for all search terms, the method ends at block 1316.

Figure 14:
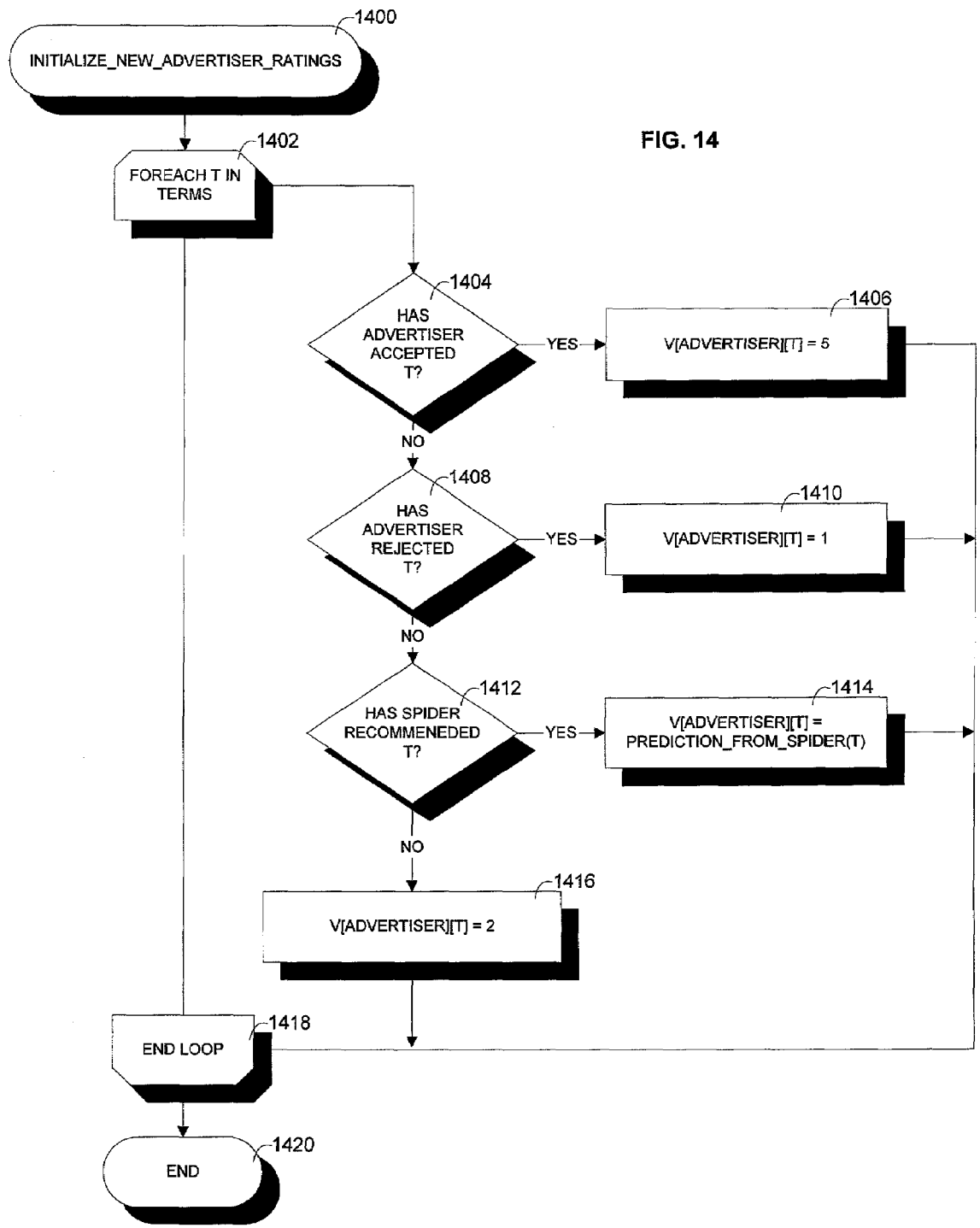

FIG. 14 is a flow diagram showing a preferred algorithm for initializing the rating values of the new advertiser. The algorithm is a loop over every search term. For each term, the program sets the rating to 5 if the new advertiser has accepted the term, and to 1 if he has rejected it. If he has done neither, and the spider has recommended the term, then the program sets the rating to the spider's estimated rating. If none of these three cases hold, the program sets the rating value to 2.

The method begins at block 1400. At block 1402, a loop is entered using a term variable T as the looping variable. At block 1404, it is determined if the advertiser has accepted the term associated with the variable T for the advertiser's search terms. If so, at block 1406, the rating V[A][T] for the advertiser and term is set to a value of 5 in the array of ratings. Control proceeds to block 1418 to select a next term for the looping variable T. If the advertiser has not accepted the current search term T, at block 1408 it is determined if the advertiser has rejected it. If so, at block 1410, the rating V[A][T] for the advertiser and term is set to a value of 1 and control proceeds to block 1418 to increment the looping variable. If the advertiser has not rejected the term T, at block 1412 it is determined if the spidering algorithm has recommended the term associated with the variable T. If so, at block 1414, the rating V[A][T] for the advertiser and term is set to a value equal to the rating established by the spidering algorithm. Otherwise, the rating V[A][T] for the advertiser and term is set to a value of 2. Control then proceeds to block 1418 to increment the looping variable. After all terms have been processed, the method ends at block 1420.

Figure 15:
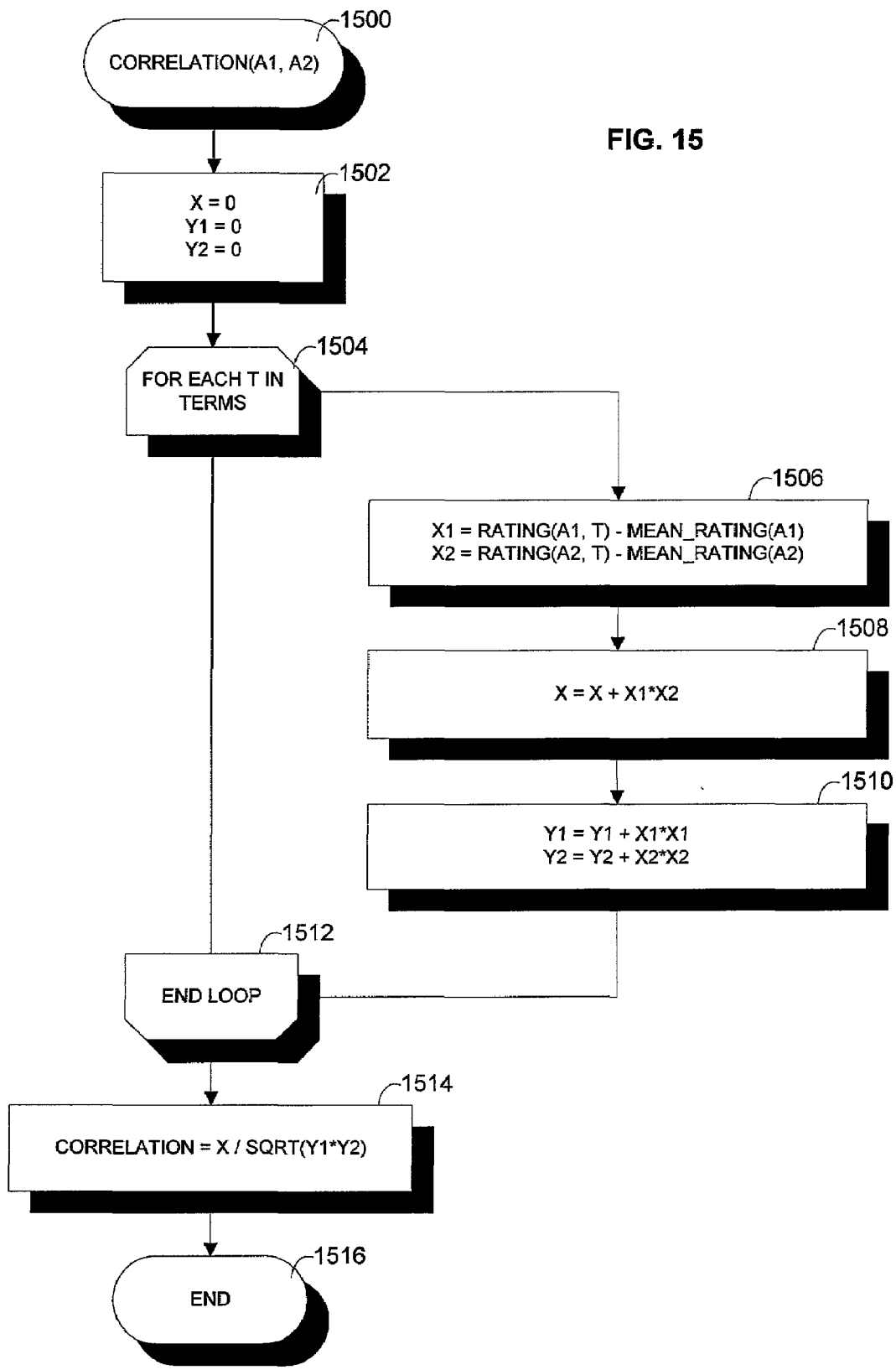

FIG. 15 is a flow diagram illustrating an algorithm for calculating the Pearson correlation between two advertisers. This algorithm is a loop over every search term. For each term, the program accumulates values that allow it to calculate the Pearson correlation formula.

$$\rho_a = \frac{\sum_t (r_{n,t} - \bar{r}_n)(r_{a,t} - \bar{r}_a)}{\sigma_n \sigma_a}$$

The X variables accumulate the value of the numerator, and the Y variables accumulate the value of the denominator. After the program has looped over all the search terms, it calculates the correlation using the final expression in the flowchart.

The method begins at block 1500. At block 1502, variables X, Y1 and Y2 are initialized. A loop is entered at block 1504 for processing each search term in the list of search terms. At block 1506, variables X1 and X2 are calculated using a rating algorithm. The rating algorithm computes the rating an advertiser assigns to a search term. One embodiment of a suitable rating algorithm is described below in conjunction with FIG. 16. At block 1508, the values of X1 and X2 are combined with the previous value of X as shown to produce the current value of X. At block 1510, values of Y1 and Y2 are updated using the calculated values of X1 and X2. At block 1512, control loops back to block 1504 until all search terms have been processed. The Pearson correlation is then calculated as shown at block 1514. The method ends at block 1516 and the value of the Pearson correlation is returned.

Figure 16:
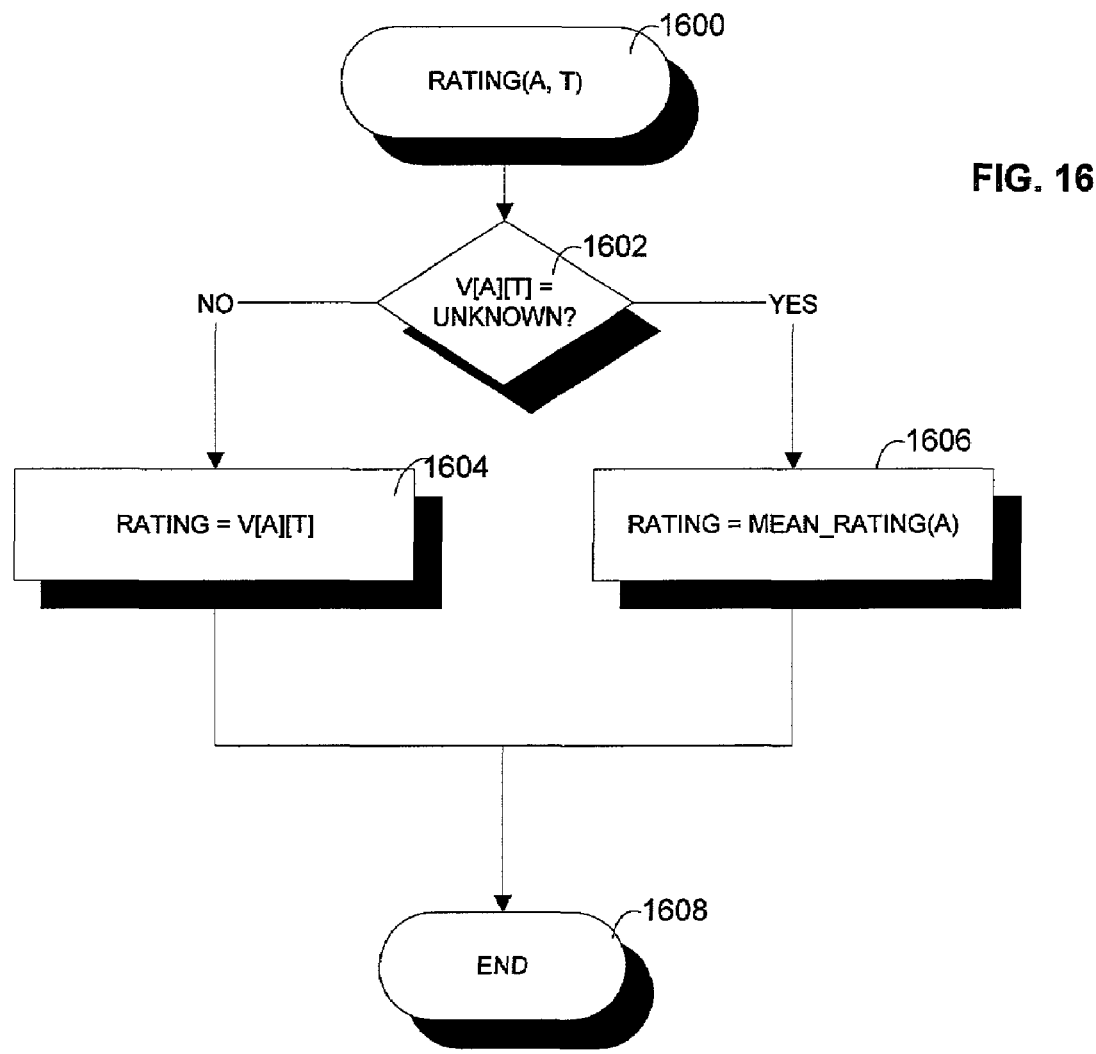

FIG. 16 is a flow diagram showing one embodiment of an algorithm for calculating the rating that an advertiser assigns to a term. If the rating recorded in the V[A][T] array is not UNKNOWN, the algorithm simply returns it. Otherwise it returns the advertiser's mean rating.

The method begins at block 1600. Two variables are passed, an advertiser variable and a term variable. At block 1602, it is determined if the rating associated with the advertiser and the term is unknown. If not, at block 1604 the rating is set equal to the rating value in the array of ratings. If the variable is unknown, at block 1606 the rating is set equal to the advertiser's mean rating. One method for calculating the advertiser's mean rating is described below in conjunction with FIG. 17. The rating is returned and the method ends at block 1608.

Figure 17:
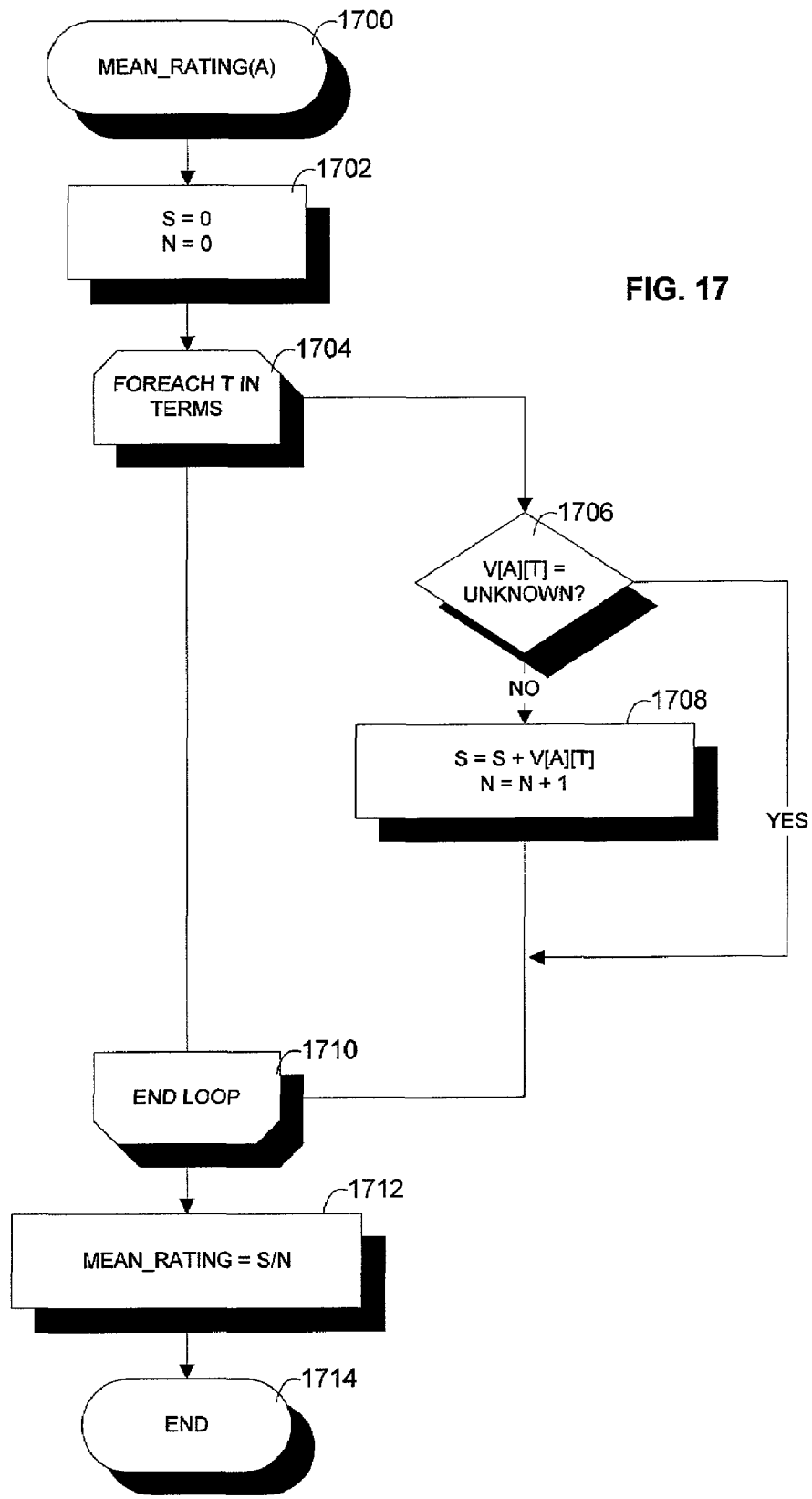

FIG. 17 is a flow diagram showing one embodiment of an algorithm for calculating an advertiser's mean rating. The algorithm is a loop over every search term. For each search term that has a known rating, the program adds the rating to the sum S and increments the counter N. At the end of the loop, the mean rating is simply the ratio S/N.

The method begins at block 1700. At block 1702, a sum variable S and a count variable N are initialized. At block 1704, a loop is entered, selecting search terms of the advertiser's list according to the looping variable. At block 1706, it is determined if the rating for the search term, stored in the rating array, has a value of UNKNOWN. If not, at block 1708, the value of the rating V[A][T] is added to the sum variable S and the count variable N is incremented. Control proceeds to block 1710 where the loop is repeated until all search terms in the advertiser's list of search terms have been processed. At block 1712, the mean rating is calculated as the ratio of S to N. At block 1714, the method ends and the mean rating is returned.

Figure 18:
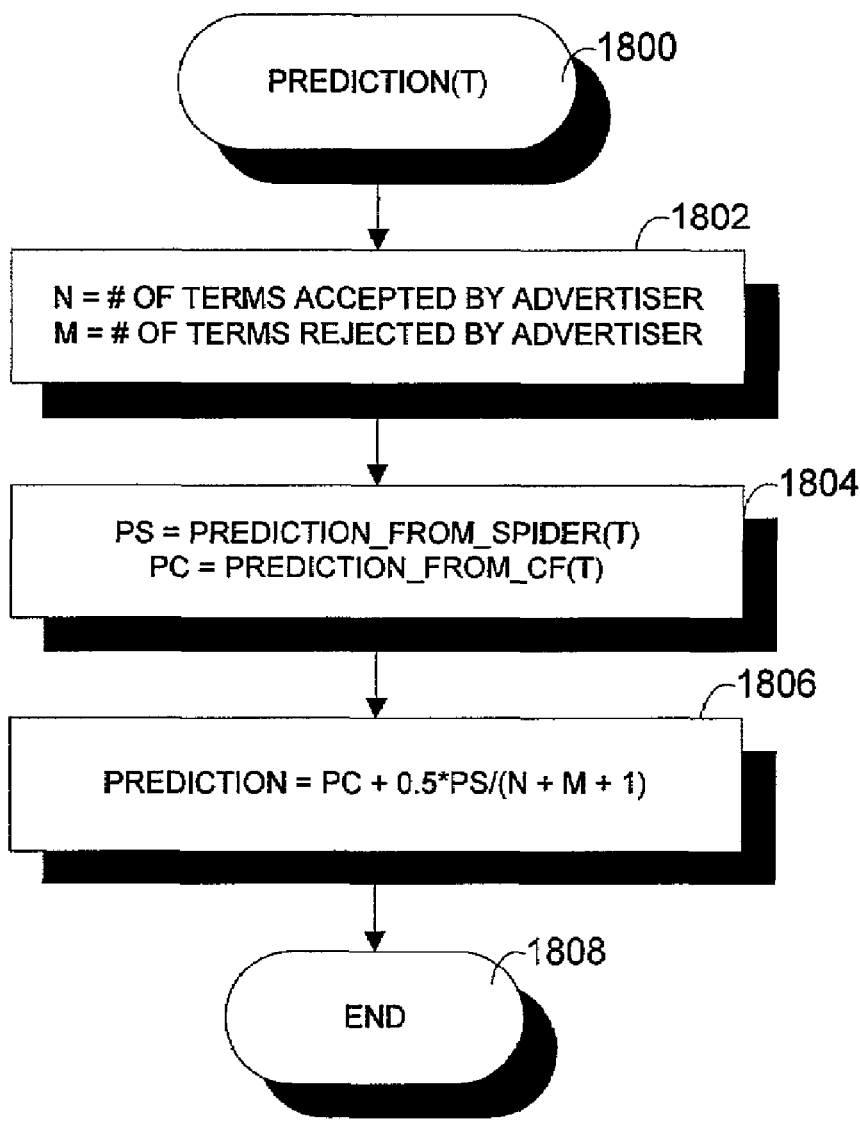
FIGS. 18–20 are flow diagrams illustrating combination of predictions from spidering and collaborative filtering.

FIG. 18 is a flow diagram showing one embodiment of an algorithm for combining recommendations from the web spider and collaborative filter. A term's combined rating is a weighted sum of the spider's rating and the collaborative filter's rating. Initially, when the advertiser has not yet accepted or rejected any terms, the algorithm weights the ratings of the collaborative filter twice as strongly as it weights the recommendations of the spider. As the number of accepted and rejected terms increases, the weight of the spider ratings decreases proportionally. There are many other possible formulas for generating a combined rating from the individual ratings, and the current invention is not limited to any one of them.

In the embodiment of FIG. 18, the method begins at block 1800. At block 1802, a variable N is set equal to the number of recommended search terms accepted by the advertiser and a variable M is set equal to the number of recommended terms rejected by the advertiser. At block 1804, two routines are called to calculate the predicted rating from the spider and the predicted rating from collaborative filtering. Exemplary embodiments of these routines are discussed below in conjunction with FIGS. 19 and 20 respectively. At block 1806, the predictions are combined and the result returned as the method ends at block 1808.

Figure 19:
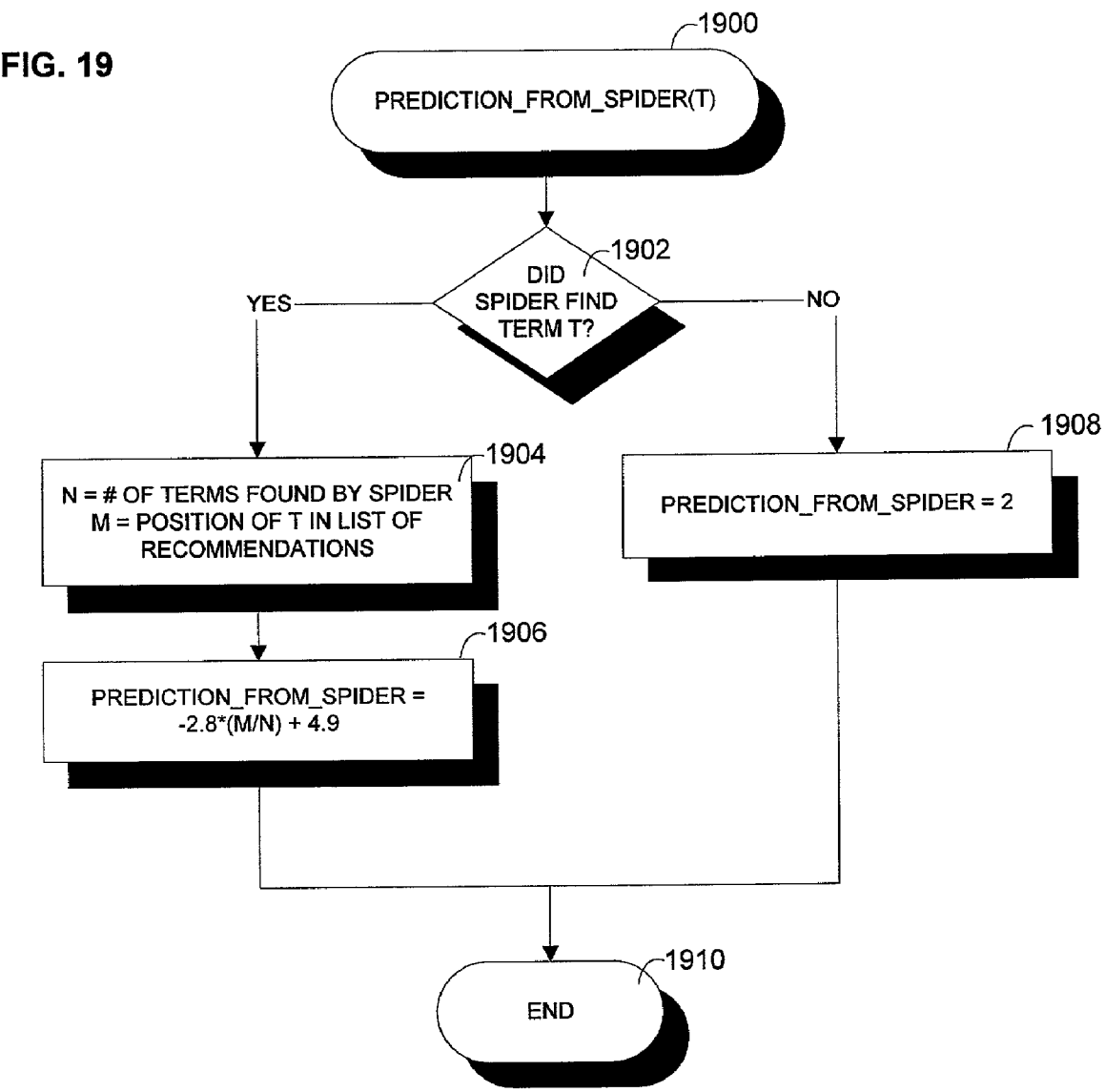

FIG. 19 is a flow diagram showing one embodiment of an algorithm for calculating the spider's ratings. If the spider has not found a term, or if the term did not pass its quality filter, then the algorithm assigns it a rating of 2. The remaining terms receive ratings on a linear scale from 4.9 down to 2.1. The top term that the spider recommends receives a rating of 4.9, and the last term that it recommends receives a rating of 2.1. There are many other possible formulas for generating ratings from the spider's ranked recommendations, and the current invention is not limited to any one of them.

The method begins at block 1900. At block 1902, it is determined if the spider found the term passed to the method in the term variable T. If so, at block 1904 a variable N is set equal to the number of terms found by the spider and a variable M is set equal to the position of the term T in the sorted list of recommendations returned by the spider.

At block 1906, the predicted rating from the spider is calculated according to the illustrated formula. At block 1908, if the spider did not find the term T, the predicted rating from the spider is set equal to 2. The method ends at block 1908 and the predicted rating from the spider is returned.

Figure 20:
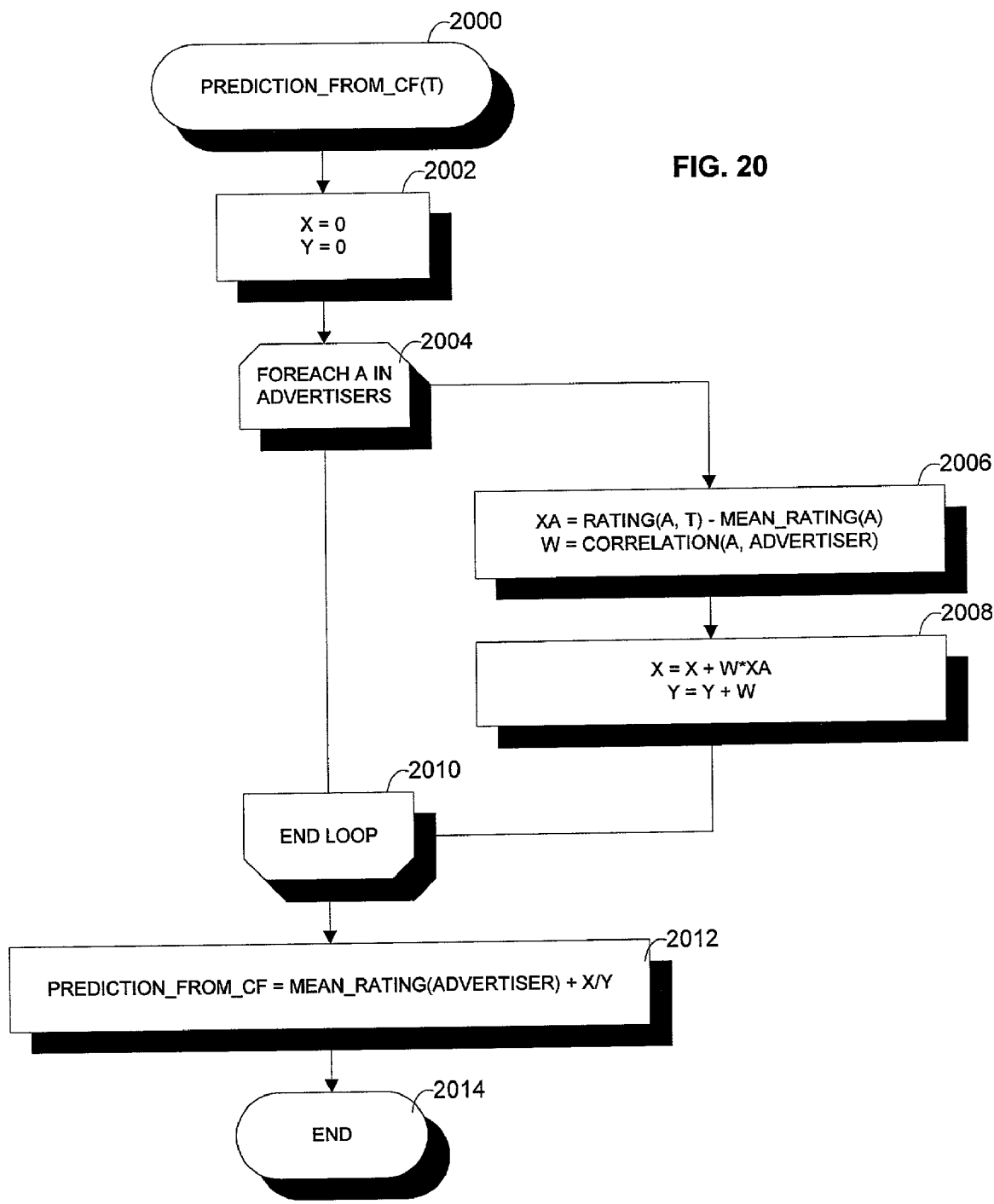

FIG. 20 is a flow diagram showing one embodiment of an algorithm for calculating the collaborative filter's ratings. The algorithm is a loop over every advertiser. For each advertiser, the program accumulates values that allow it to calculate the rating according to the formula $$e_t = \bar{r}_n + \frac{\sum_a (r_{a,t} - \bar{r}_a)\rho_a}{\sum_a \rho_a}$$

A variable X accumulates the value of the numerator, and a variable Y accumulates the value of the denominator. In the last step, the algorithm calculates the final rating using the expression shown in the flowchart. This final rating may fall outside of the range 0 to 5, but it can still be correctly interpreted on this scale.

The method begins at block 2000. At block 2002, the variables X and Y are initialized. A loop is entered at block 2004, one advertiser being processed for each iteration through the loop. At block 2006, values for variables XA and W are evaluated as shown. At block 2008, values for X and Y are updated using the values of W and XA. At block 2010, control returns to the start of the loop at block 2004 to process the next advertiser. After all advertisers have been processed, the prediction from collaborative filtering is calculated using the formula in block 2012 and the mean rating algorithm described above in conjunction with FIG. 17. The method ends at block 2014 and the prediction from collaborative filtering is returned.

From the foregoing, it can be seen that the present embodiments provide a method and apparatus for recommending search terms to an advertiser on a pay-for-placement search system. The method and apparatus make search term recommendations based on the contents of the advertiser's web site and by comparing the advertiser to other similar advertisers and recommending search terms they have chosen. In this manner, the system recommends good search terms, or terms having a relation to the advertiser's web site or its content, while avoiding bad search terms which have no such relation. The system is interactive with the advertiser, allowing him to decide when the set of search terms is sufficient for his requirements. However, the process of identifying and ranking search terms is automated and is based on actual pages of the advertiser's web site and by comparisons to other advertisers.

While a particular embodiment of the present invention has been shown and described, modifications may be made. It is therefore intended in the appended claims to cover such changes and modifications, which follow in the true spirit and scope of the invention.

The invention claimed is:

1. A method for recommending search terms in a computer network search apparatus for generating a result list of items representing a match with information entered by a user through an input device connected to the computer network, the search apparatus including a computer system operatively connected to the computer network and a plurality of items stored in a database, each item including information to be communicated to a user and having associated with it at least one search term, an information provider and a bid amount, the method comprising:

(a) obtaining a set of potential search terms for acceptance by a new information provider who is adding items to the database, including;
   receiving from the new information provider a website uniform resource locator (URL); and
   spidering the website associated with the website URL to obtain search terms for the set of potential search terms;
(b) computing correlations between the potential search terms for the new information provider and search terms of other information providers stored in the database;
(c) computing an estimated rating for the each potential search term for the new information provider;
(d) sorting the potential search terms according to the computed estimated ratings;
(e) presenting to the new information provider on an output device the sorted potential search terms;
(f) receiving from the new information provider at an input device an indication of accepted search terms;
(g) repeating (b) through (e) until a completion indication is received from the new information provider; and
(h) storing the accepted search terms in the database for the new information provider upon receipt of the completion indication.

2. The method of claim 1 wherein spidering the website comprises:
   receiving data from pages of the website;
   recording potential search terms from the data; and
   determining a quality metric for each potential search term.

3. The method of claim 2 wherein computing an estimated rating comprises:
   combining a rating based on the computed correlations and a rating based on the quality metric determined for each candidate search term.

4. The method of claim 2 further comprising:
   sorting the candidate search terms according to the quality metric; and
   adding to the set of potential search terms only candidate search terms having a quality metric exceeding a threshold.

5. The method of claim 1 wherein spidering comprises:
   receiving data from one or more pages of the website; and
   examining text from the one or more pages for candidate search terms.

6. The method of claim 5 wherein examining text comprises:
   examining substantially all text from the one or more pages; and
   examining meta tags from the one or more pages.

7. The method of claim 5 wherein receiving a website URL comprises:
   receiving the advertiser's URL as the web site URL.

8. The method of claim 5 wherein receiving a website URL comprises:
   receiving the web site URL from the advertiser.

9. The method of claim 1 wherein computing correlations comprises:

assigning ratings to search terms; and
computing a correlation between the advertiser and one or more of the other advertisers using the assigned ratings of advertiser search terms.

10. The method of claim 9 wherein computing an estimated rating comprises:
predicting a likelihood that a search term will be relevant to the advertiser.

11. The method of claim 10 wherein predicting comprises:
determining a quality metric for potential search terms; and
predicting relevance of the potential search terms based on the quality metric.

12. The method of claim 1 wherein presenting the sorted potential search terms to the new information provider comprises sending the sorted potential search terms with a web page to the output device.

13. A computer network search engine apparatus which includes a database having stored therein a plurality of search listings, each search listing being associated with an information provider, at least one keyword, a money amount and a computer network location and a search engine to identify search listings having a keyword matching a keyword entered by a searcher, to order the identified listings using the money amounts for the respective identified listings, and to generate a result list including at least some of the ordered listings, the apparatus comprising:
an account management server including a processing system which is operative in conjunction with program code to recommend potential search terms to a new information provider adding search listings to the database;
collaborative filtering code operable in conjunction with the processing system to compute correlations between potential search terms for the new information provider and search terms of other information providers stored in the database and to compute an estimated rating for the each potential search term for the new information provider;
sorting code operable in conjunction with the processing system and configured to sort the potential search terms according to the computed estimated ratings;
spidering code overable in conjunction with the processing system to find initially accepted search terms in a web site by spidering the web site and to include the initially accepted search terms among the sorted potential search terms;
an output device configured to provide the sorted potential search terms to the new information provider for review; and
an input device configured to receive from the new information provider an indication of accepted search terms, the accepted search terms being stored in the database in association with the new information provider upon receipt of the indication from the new information provider.

14. The computer network search engine apparatus of claim 13 wherein the spidering code is configured to spider a web site of the new information provider.

15. The computer network search apparatus of claim 14 wherein the spidering code is configured to spider a web site specified by the new information provider.

16. The computer network search engine apparatus of claim 13 wherein the spidering code is configured to retrieve pages from the web site of the new information provider, record terms contained in the retrieved pages and score the terms according to a quality metric.

17. The computer network search engine apparatus of claim 16 wherein the spidering code is configured to include terms scoring above a threshold score among the sorted potential search terms.

18. A method for making search term recommendations to an advertiser in a pay for placement market system in which search listings of advertisers may be searched by users entering search terms, the method comprising:
receiving from the advertiser a website uniform resource locator (URL);
spidering the website associated with the website URL to obtain an initial list of search terms to form a set of potential search terms for the advertiser;
computing correlations between the set of potential search terms for the advertiser and search terms of other advertisers stored in a database of the pay for placement market system;
computing an estimated rating for each potential search term for the advertiser;
sorting the potential search terms according to the estimated ratings;
providing the sorted potential search terms to the advertiser;
receiving from the advertiser the advertiser's indication of accepted search terms; and
storing the accepted search terms in the database for searching by the users.

19. The method of claim 18 further comprising:
repeating the acts of computing correlations, computing an estimated rating, sorting and providing the potential search terms and receiving an indication of accepted search terms until the advertiser indicated the process is complete.

* * * * *